US012310273B2

(12) United States Patent
Fjelstad et al.

(10) Patent No.: US 12,310,273 B2
(45) Date of Patent: May 27, 2025

(54) GUIDANCE SYSTEMS AND METHODS

(71) Applicant: Raven Industries, Inc., Sioux Falls, SD (US)

(72) Inventors: Stephen Filip Fjelstad, Worthing, SD (US); Matthew K. Rust, Sioux Falls, SD (US); Charles Harwood, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 7 days.

(21) Appl. No.: 17/190,187

(22) Filed: Mar. 2, 2021

(65) Prior Publication Data

US 2021/0267115 A1 Sep. 2, 2021

Related U.S. Application Data

(60) Provisional application No. 62/984,256, filed on Mar. 2, 2020.

(51) Int. Cl.
*A01B 69/04* (2006.01)
*G05D 1/00* (2024.01)

(52) U.S. Cl.
CPC ......... *A01B 69/008* (2013.01); *G05D 1/0248* (2013.01); *G05D 1/0257* (2013.01)

(58) Field of Classification Search
CPC .. A01B 69/008; G05D 1/0248; G05D 1/0257; G05D 2201/0201; G05D 1/0219
See application file for complete search history.

(56) References Cited

U.S. PATENT DOCUMENTS

| 7,502,678 B2 | 3/2009 | Diekhans et al. |
| 8,359,141 B1 | 1/2013 | Lange |

(Continued)

FOREIGN PATENT DOCUMENTS

| JP | 2020087308 A | * | 6/2020 | ........... A01B 69/008 |
| WO | 2023211775 | | 11/2023 | |

OTHER PUBLICATIONS

Plessen, M. G. (Oct. 26, 2019). Freeform path fitting for the minimisation of the No. of transitions between headland path and interior lanes within agricultural fields. arXiv.org. https://arxiv.org/abs/1910.12034v1 (Year: 2019).*

(Continued)

*Primary Examiner* — Jess Whittington
*Assistant Examiner* — Shahira Baajour
(74) *Attorney, Agent, or Firm* — Schwegman Lundberg & Woessner, P.A.

(57) ABSTRACT

A guidance assembly for an agricultural vehicle includes a pathing system configured to provide an array of swaths. The guidance assembly includes a composite guidance system in communication with an automated driving interface and the pathing system. The composite guidance system includes a turn guidance system configured to guide the agricultural vehicle along at least one turn segment extending between a first zone swath and a transverse second zone swath, and a swath guidance system configured to guide the agricultural vehicle along the first zone swath and the transverse second zone swath. The system includes a comparator configured to compare the agricultural vehicle position with swath departure and arrival locations. An inter-swath turning element automatically toggles the turn and swath guidance systems between activated and paused configurations according to the compared agricultural vehicle position and the swath departure and arrival locations.

47 Claims, 13 Drawing Sheets

(56) References Cited

U.S. PATENT DOCUMENTS

| | | | |
|---|---|---|---|
| 9,968,025 | B2 | 5/2018 | Bunderson et al. |
| 2004/0193348 | A1 | 9/2004 | Gray et al. |
| 2008/0059015 | A1 | 3/2008 | Whittaker et al. |
| 2008/0249692 | A1 | 10/2008 | Dix |
| 2009/0265053 | A1* | 10/2009 | Dix ................ G05D 1/0219 701/26 |
| 2011/0196565 | A1* | 8/2011 | Collins ............ G05D 1/0219 701/25 |
| 2013/0282224 | A1* | 10/2013 | Yazaki ............ G05D 1/0219 701/24 |
| 2014/0005918 | A1* | 1/2014 | Qiang ............. B60D 1/245 701/300 |
| 2015/0331423 | A1* | 11/2015 | Volger ............ A01B 69/008 701/25 |
| 2017/0144702 | A1 | 5/2017 | Dang et al. |
| 2017/0357267 | A1* | 12/2017 | Foster ............. G05D 1/024 |
| 2018/0325013 | A1* | 11/2018 | Boydens .......... G05D 1/0231 |
| 2019/0208695 | A1 | 7/2019 | Graf Plessen |
| 2020/0020103 | A1 | 1/2020 | Sneyders et al. |
| 2020/0053962 | A1* | 2/2020 | Dix ................. A01D 41/1278 |
| 2020/0296878 | A1* | 9/2020 | Dix ................. G05D 1/0278 |
| 2021/0405644 | A1* | 12/2021 | Berridge .......... G05D 1/0219 |

OTHER PUBLICATIONS

English Translation of JP-2020087308-A (Year: 2024).*

"International Application Serial No. PCT/US2021/070216, International Search Report mailed May 26, 2021", 2 pgs.

"International Application Serial No. PCT/US2021/070216, Written Opinion mailed May 26, 2021", 9 pgs.

"International Application Serial No. PCT/US2021/070216, International Preliminary Report on Patentability mailed Sep. 15, 2022", 11 pgs.

"European Application Serial No. 21764302.2, Extended European Search Report mailed Feb. 29, 2024", 9 pgs.

"European Application Serial No. 21764302.2, Response filed Sep. 19, 2024 to Extended European Search Report mailed Feb. 29, 2024", 41 pgs.

* cited by examiner

GUIDANCE SYSTEMS AND METHODS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc. of Sioux Falls, South Dakota. All Rights Reserved.

TECHNICAL FIELD

This document pertains generally, but not by way of limitation, to automated guidance of agricultural vehicles.

BACKGROUND

Agricultural vehicles are driven through fields to conduct various agricultural operations including tilling, seeding, planting, spraying, harvesting and the like. In some examples, operators use field computers that overlay a field map and proposed routes through the field to accomplish agricultural operations. For instance, the field is divided into polygons, sections or the like, and paths are overlaid onto the field map to assist the operator in driving the vehicle along predetermined swaths (a pass through the field along a generally linear, not necessarily straight, line) corresponding to the paths.

In other examples, agricultural vehicles include row guidance systems that assist in driving of the vehicles between crop rows. For instance, the row guidance systems assist the operator in observing crop rows to facilitate guidance of the vehicle ground engaging elements (wheels, tracks or the like) between the rows to decrease crop damage, compaction or the like. The row guidance system operates while the agricultural vehicle is conducting an operation along a swath of the field including one or more crop rows (e.g., 12, 24, 36, 48 crop rows or the like).

Optionally, a row guidance system is a component of an autonomous (including semiautonomous) guidance system that drives the agricultural vehicle along the crop rows, and maintains the ground engaging elements between crop rows within a swath. For example, the row guidance system senses crop rows and steers the vehicle between crop rows to minimize damage to the crop.

SUMMARY

The present inventors have recognized, among other things, that a problem to be solved includes fully autonomous driving of an agricultural vehicle in a field to include swath guidance of the vehicle along swaths (e.g., with ground engaging elements between crop rows) in the field as well as seamlessly integrating turning between swaths.

In some examples autonomous driving systems drive agricultural vehicles while conducting operations within swaths. In one example, agricultural vehicles are guided along a preplanned path, such as guidance lines, A-B lines, an indexed path of a previously driven vehicle or the like (e.g., path guidance). In another example, the guidance systems provide swath guidance along one or more of these types of paths that also maintain the ground engagement elements of the vehicle between crop rows to minimize damage to crops otherwise caused with overrunning and corresponding crushing of the crop. At the end of the swath the operator overrides guidance, assumes control of the vehicle and conducts a turn from the completed swath to a proximate swath, such as a swath having a generally similar orientation and next to or spaced one or more swath widths from the completed swath. The operator drives the vehicle during the turn to avoid obstacles, minimize damage to crops in adjacent field zones, such as the headland or a zone with transversely oriented crop rows (e.g., at an angle to the crop rows of the completed swath), and to line up the vehicle for operation along the next swath having the generally similar orientation to the completed swath. As the agricultural vehicle approaches the next swath the guidance system (e.g., including path guidance and swath guidance) is reinitiated and the operator surrenders driving of the agricultural vehicle to the guidance system.

In other examples autonomous driving systems provide selectable driving systems. For instance, a swath guidance system is selected to drive the agricultural vehicle along swaths (e.g., to maintain ground engaging elements between crop rows). At an end of a swath the operator turns off the swath guidance system and initiates an automatic turn with a specified turn pattern to a proximate (next) similarly oriented swath. The turn pattern is conducted, and the operator deselects the automatic turn and selects the swath guidance system to conduct operations including driving along the proximate (next) swath.

In each of the examples provided above the agricultural vehicle is driven during turning through one or more crop rows or field zones (e.g., headlands, adjacent field zones, swaths surrounding obstacles or the like) that are oriented transversely to the completed swath. In the example including the operator driven turns the operator is responsible for minimizing damage to crop rows and avoiding obstacles. Depending on the skill of the operator the damage to the crop is significant or moderated. In the example including the operator selected turn pattern the damage to crop rows may be significant as the turn pattern is agnostic to the orientation of the transverse swath and is instead intended to reorient the vehicle to the proximate swath associated with completed swath. Further, in some examples obstacles within the turn pattern (e.g., fences, ponds, ditches, culverts or the like) are effectively ignored and result in collisions or require operator intervention to avoid collisions.

In each of the examples provided above, significant harm to crops is possible along with potential damage to the agricultural vehicle, obstacles in the field (e.g., fences) or the like through collisions. Crushing of crops and corresponding loss in yield, and the likelihood of a potential collision are multiplied for each turn conducted with the vehicle with some fields having dozens or hundreds of turns. Additionally, even with a specified turn pattern that is conducted automatically in combination with some form of swath guidance the operator intervenes to avoid obstacles, such as fences, ditches, or the like and in at least some examples is responsible for selecting respective swath or turn pattern control of the vehicle at the end and beginning of each swath and turn. Accordingly, the operator continues to maintain an active (e.g., at least semi-active) role in operation of the agricultural vehicle.

The present subject matter provides a solution to this problem with guidance assemblies that guide an agricultural vehicle along swaths as well as through turns autonomously, and without triggering intervention from an operator. The example guidance assemblies include an automated driving interface that controls one or more driving functions of the agricultural vehicle including, but not limited to, steering, throttle (acceleration) and braking. A pathing system provides an array of swaths indexed to a field including at least first and second field zones, such as an interior first field zone, a perimeter headland second field zone or other field zone configurations including a field having two or more zones with swaths arranged in transverse orientations to each other.

An example guidance assembly includes a composite guidance system in communication with the automated driving interface and the pathing system. The assembly includes a swath guidance system and a turn guidance system. An interswath turning element automatically toggles the turn and swath guidance systems as needed for swath or turn guidance. For instance, the interswath turning element activates the swath guidance system (e.g., is in an active configuration) and pauses the turn guidance system (e.g., is in a paused configuration) while driving along a swath. When a turn is specified (e.g., for transitioning between swaths of different field zones) the interswath turning element toggles the guidance systems to pause the swath guidance system (a paused configuration) and move the turn guidance system into the active configuration. Optionally, the guidance systems are not deactivated per se when in a paused configuration, but are instead moved lower in priority. In this example the paused guidance system is able to provide additional information (e.g., such as GPS or RTK location of the vehicle) for use in toggling of guidance systems, conducting of driving and agricultural operations along swaths and turns or the like. For instance an agricultural vehicle location is compared with a swath departure location along a swath guidance line and turn segment to trigger switching from the swath guidance system to the turn guidance system as well as initiate a vehicle turn toward the oncoming swath (e.g., a transverse swath or proximate swath). The comparison of the agricultural vehicle location with a swath arrival location (along the turn segment and oncoming swath) triggers switching from the turn guidance system to the swath guidance system and initiates vehicle driving along the oncoming swath. Accordingly, the guidance assembly described herein seamlessly hands off control of the autonomous agricultural vehicle throughout operation within a field including operations along swaths and between swaths (e.g., interswath operations or turning).

The guidance assembly transitions between the guidance systems automatically with turn segments that provide an interface between swaths along with swath departure and swath arrival locations. The guidance system in another example, marries one or more turn profiles between the first zone swath and the oncoming second zone swath to generate a corresponding turn segment. The second zone swath (e.g., in a headland or other second field zone) is transverse with the first zone swath and accordingly provides an intersection, for instance between the swaths, their associated guidance lines or the like. The guidance system indexes the intersection between the turn profile and the first zone swath as the swath departure location. In another example, the guidance system indexes the intersection between the turn profile and the second zone swath as the swath arrival location. The turn segment extends between the indexed swath departure and arrival locations and includes the portion of the turn profile extending therebetween. Optionally, the process for generating turn segments is automatically repeated based on the array of swaths provided with a pathing system to plot turn segments between each of the swaths according to driving priorities set by the operator, field map or the like (e.g., a field starting location, field finishing location, zone priorities or the like). In another example, the turn segments are generated in an ongoing manner while the vehicle is operated. For instance, as the vehicle moves along the first zone swath the turn profile is married to the forthcoming intersection of the first zone swath and the second zone swath detected with one or more onboard sensors (e.g., cameras or the like), GPS or RTK monitoring or the like. The turn profile is then married between the swaths as described herein.

The turn profiles are selected (e.g., preplanned or in an ongoing manner) based on one or more vehicle characteristics, field characteristics (e.g., clearance between a zone and a fence) or the like. Additionally, the turn profiles are optionally selected to minimize overrunning of crops and instead enhance driving along a swath (e.g., a headland) and thereby increase the crop yield along zones such as the headlands that in other examples routinely have lower yields. For example, turn profiles are selected and applied to generate corresponding turn segments that quickly transition the vehicle out of the turn and turn guidance and back to swath guidance along the swath, such as a headland, to minimize overrunning otherwise caused with wide or long turns that cross through more of the crop rows and overrun correspondingly more of the crop. In examples, described herein, the guidance systems (turn guidance and swath guidance systems) are toggled to operate the agricultural vehicle in a composite turn that includes first and second turn segments and an intervening swath segment. The first and second turn segments provide interfaces between a first zone swath of a first field zone, a transverse second zone swath of a second field zone (such as a headland), and a first proximate (next) zone swath also of the first field zone, respectively. The intervening swath segment connects the first and second turn segments and ensures the turn between the first and first proximate zone swaths includes swath guidance that minimizes crop overrunning while the first and second turn segments decrease the length of actual turning of the vehicle that otherwise increases crop overrunning.

The guidance assembly examples described herein facilitate fully automated driving operation of the agricultural vehicle while minimizing operator intervention, for instance at end of row turning, turning between field zones, oncoming obstacles that include correspond perimeter swaths, or the like. Additionally, the guidance assembly examples minimize collisions with obstacles, such as fences, lakes, ditches, trees, poles or the like by using corresponding pathing information, such as swaths (associated guidance lines or the like) extending along or around these obstacles, to automatically guide the vehicle along or around the obstacles. Further still, automated guidance based on the pathing information, such as planned guidance lines for swaths, enhances the repeatability of turns. For instance, because operation of the turn guidance system and driving through the turn is based on swaths the turn segment between swaths remain consistent between operations (e.g, multiple spraying operations). Accordingly, an agricultural sprayer that is potentially deployed multiple times in the same field follows the same turn segments (e.g., identical or similar) each time and thereby minimizes overrunning and crushing of crops in successive operations.

Accordingly, the guidance assembly examples described herein enhance the flexibility of autonomous driving operations in a manner approximating human judgement that varies turn geometry based on the characteristics of a field, the characteristics of the agricultural vehicle, minimizing crop overrunning, variations in swaths (e.g., angle of swaths, orientation between swaths), movement between zones of the field or like.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
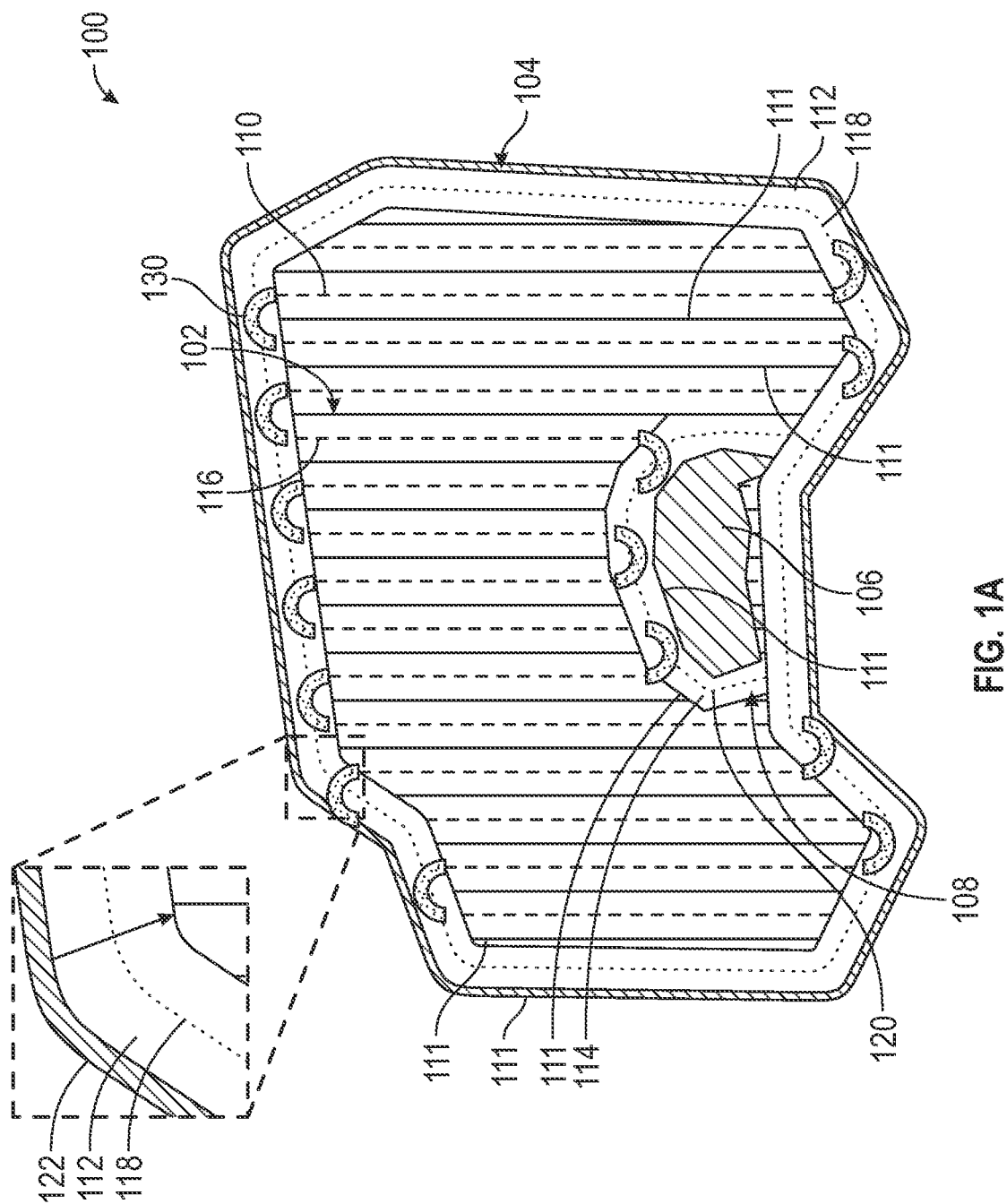
FIG. 1A is a schematic diagram of a field including swaths and consistent turn profiles.

FIG. 1A is a schematic view of an example field 100 including a plurality of example swaths 110, 112, 114. As shown the field 100 includes a plurality of swaths 110 arranged in a generally similar orientation in an example first field zone 102. For instance, the first field zone 102 in this example includes one or more of the interior portion of the field 100, a zone including crops planted in a generally similar orientation or alignment. As further provided herein, in other examples, field zones include crops planted in a perimeter extending around one or more obstacles or as headlands (e.g., surrounding another field zone). In the example shown in FIG. 1A a plurality of field zones 102, 104 are provided. In another example, an obstacle 106 (e.g., landmark, body of water, waterway, fend line, pole, ravine, tree or the like) is another field zone having an associated swath 114 or swaths.

When referring to swaths 110, 112, 114 in the field 100 (and herein) reference is made to one or more conventions for a swath including, but not limited to, guidance lines; coverage guidance lines; virtual swath lines; A-B lines; planned paths for an agricultural vehicle; LastPass lines (e.g., a trademark of Raven Industries); offset straight lines between two end points, lines or zones; guidance lines that pivot, circumscribe or extend around a point, obstacle or the like; actual swath lines; swath edges; crop rows; crop edges; ridges or mounds for crop planting; tram lines; previous vehicle passage swath lines; obstacle perimeters; boundaries; fence lines; old fence lines; water ways; river and creek beds; actual or virtual coverage of an agricultural implement of the agricultural vehicle along one or more of the preceding features or the like. That is to say the swaths 110, 112, 114 as described herein are used as a convention related to guidance and automated driving and control of agricultural vehicles.

Referring again to FIG. 1A, the first field zone 102 corresponds in this example to an interior portion of the field 102 having a plurality of similarly oriented swaths 110. In this example, the swaths 110 extend in a generally north to south orientation and span the right to left (west to east) edges of the first field zone 102. As shown, the examples swaths 110 include swath edges 111 indicating an edge of one swath 110 and in some of the swaths 110 indicating the border between proximate swaths. As further shown in FIG. 1A, guidance lines 116 are associated with the swaths 110 (and in some examples are representative of swaths 110). Optionally, the guidance lines 116 are virtual guidance lines 116 plotted to a virtual field map, overlaid in a heads up display for an operator or automated driving system or the like.

Additional field zones 104, 108 are shown in the example field 100. The second field zone 104 corresponds to a headland or head row extending around the first field zone 102. As shown, the second field zone 104 includes one or more associated swaths 112. As provided in the detailed offset to FIG. 1A, the swath 112 includes a first swath edge 111 extending along the first field zone 102 and a boundary 122, another example of a swath edge 111, extending along the border of the field 100. In an example, the boundary 122 corresponds to a fence line, fence line offset or the like configured to minimize collision of the vehicle with one or more surrounding obstacles or features (e.g., such as a fence, pole, tree, building or the like).

Another example of a field zone 108 is shown associated with the obstacle 106, in this example a pond or other body of water. The zone 108 includes one or more swaths 114 that extend around the obstacle 106. The swaths 114 include corresponding swath edges 111 including for instance the boundary of the obstacle 106 proximate to the swath 114 as well as swath edges 111 proximate to other features of the field 100, such as the border with an adjacent field zone 102 or a proximate (adjacent) swath. As further shown, the swaths 114, 112 optionally include respective guidance lines 120, 118 in a similar manner to the swaths 110 and their associated guidance lines 116.

As further shown in FIG. 1A, turn profiles 130 are shown proximate to the ends of the swaths 110. In one example, the turn profiles 130 are one or more consistent turn profiles used by an automated driving system to guide an agricultural vehicle from the end of one swath 110 to a proximate (e.g., sometimes adjacent or spaced) swath 110. The turn profiles 130 are used in an automated and consistent manner to ensure the agricultural vehicle departs from a first swath 110 at the end of the swath, conducts the consistent turn, and is ready for entry to the next swath 110 at the beginning (or first end) of the next swath 110. In examples, the turn profiles 130 have a consistent shape (e.g., circle, square or the like) that is formatted based on the size of the agricultural vehicle (e.g., the number of rows covered by an associated agricultural implement or the like).

In some examples, a vehicle operator overrides an automated driving system operated at the end of a swath 110 and triggers conducting of an automated turn according to the turn profile 130. As the vehicle approaches the end of the proximate (next) swath 110 the operator reengages the automated driving system, and the system then conducts driving within or along the proximate swath 110. The process is then repeated.

As shown in FIG. 1A, the turn profiles 130 have a consistent profile (e.g., size, shape or the like) that span the swaths 110, for instance according to the positions of the guidance lines 116 relative to proximate guidance lines 116. In the examples shown, the turn profiles 130 have a circular (semi-circular) profile that are conducted to drive the agricultural vehicle from a first swath 110 to a proximate swath 110. As shown, the turn profiles 130 are initiated at various locations spaced from the ends of the swaths 110 according to the contour of the first field zone 102 (e.g., the profile of the filed 100) and the preceding and forthcoming swaths 110. In some examples, the turn profiles 130 intersect with obstacles 106, boundaries 122 or the like, or the profile 130 begins or ends within a swath 110 instead of at the swath end, and accordingly overriding of the automated turn using the turn profile 130 is required, for instance by the operator.

Figure 1B:
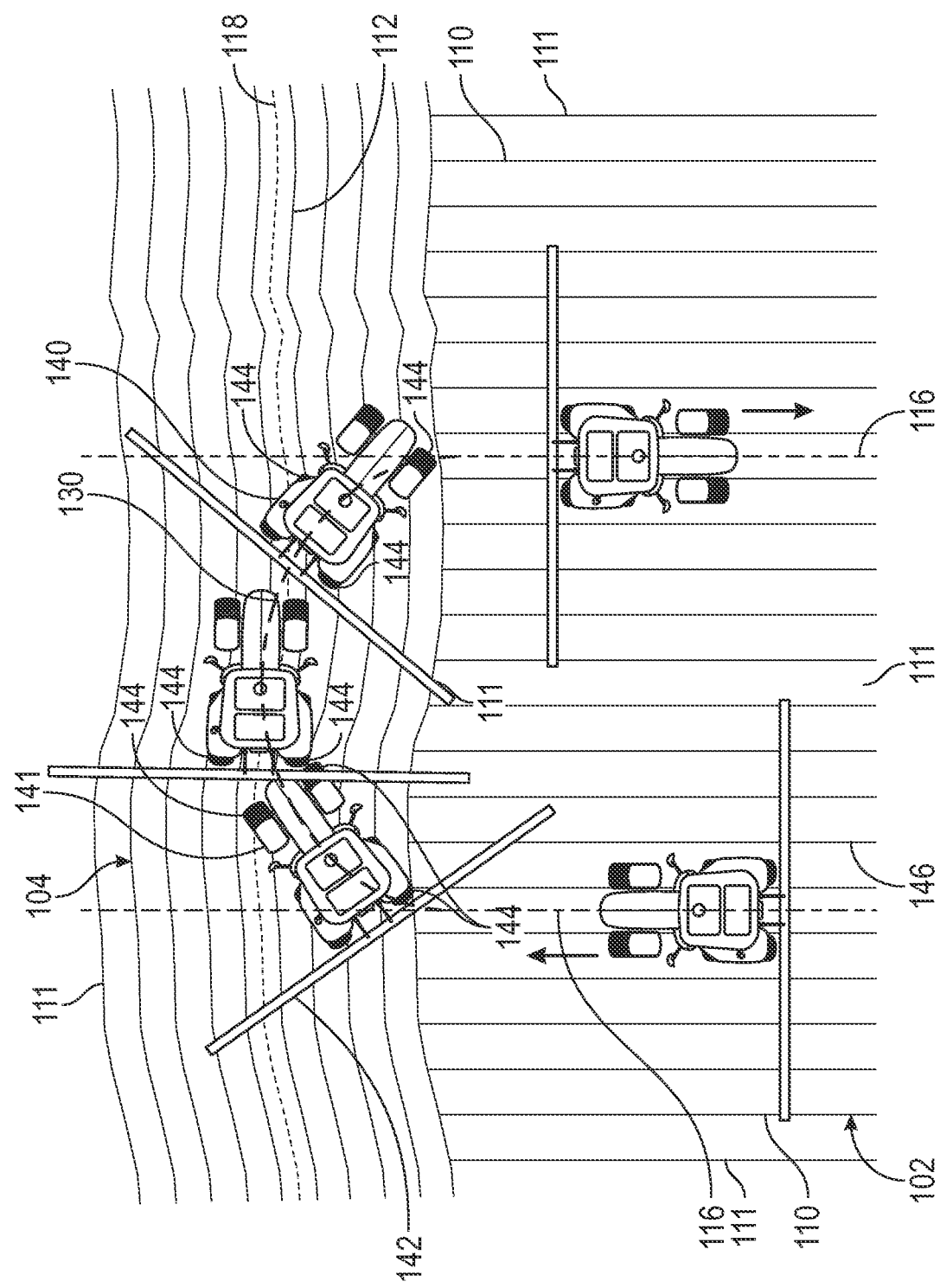
FIG. 1B is a detailed view of a portion of the field of FIG. 1A showing one example of a consistent turn profile.

FIG. 1B is a detailed schematic view of the field 100 including the swaths 110 in an example first field zone with another example swath 112. The swaths 110, 112 and their associated guidance lines 116, 118 provide an example indication of the overall profile of the swaths 110, 112. For instance, with the swaths 110 the guidance lines 116 are generally straight with correspondingly straight swath edges 111. The other example swath 112 has a linear but disjointed profile as does the associated guidance line 118, for instance because of the corresponding disjointed profile of the boundary of the swath 112 (e.g., the boundary of the field), such as the swath edge 111. In this example, the swaths 110, 112 correspond to the width or coverage of an agricultural implement 142 implement (e.g., boom width, row sections or the like) associated with an agricultural vehicle 140.

FIG. 1B illustrates one example of the agricultural vehicle 140 conducting a turn according to a specified turn profile 130, in this example a circle profile. The agricultural vehicle 140 is shown in various locations along the swath 110, the proximate (next) swath 110, and in the turn through the swath 112. As shown in FIG. 1B, the vehicle 140 includes a plurality of ground engaging elements 141 (tracks, wheels, runners or the like). While within the crop rows 146 of the swaths 110 (the relatively straight swaths) the ground engaging elements 141 are positioned between the crop rows 146 to minimize overrunning and damage to the crops.

However, as the agricultural vehicle 140 conducts the illustrated turn in correspondence with the specified turn profile 130 the ground engaging elements 141 clearly overrun multiple crop rows 146 throughout the turn with the swath 112. The crops in these overrun rows are damaged and in various examples unrecoverable with a corresponding loss in yield. For example, as shown in the three staggered views of the agricultural vehicle 140 in FIG. 1B during the turn the ground engaging elements 141 overrun a plurality of the crop rows 146. In some examples, the ground engaging elements 141 are coincident with the crop rows 146 for significant distances (e.g., the elements are parallel to the crop rows and run over the rows) and accordingly increase overrunning and the associated damage to the crops. After conducting the turn along the turn profile 130 the agricultural vehicle begins travel along the proximate swath 110.

As discussed herein, the vehicle operator may in some examples override the automated turn of the agricultural vehicle 140, and instead actively steer the vehicle in a manner that minimizes crop overrunning and damage, for instance according to the expertise and knowhow of the operator. The operator actively monitors the agricultural vehicle 140 and the automated turn conducted according to the turn profile 130, and based on the monitoring selectively overrides the automated control to provide refined turning of the vehicle. The operator thereby engages in close monitoring of the agricultural vehicle 140 that minimizes true fully automated operation of the vehicle 140. Optionally, the operator accepts the vehicle 140 will overrun more crops than necessary (in comparison to the expertise of the operator) while conducting turns in favor of more fully automating operation.

Figure 3:
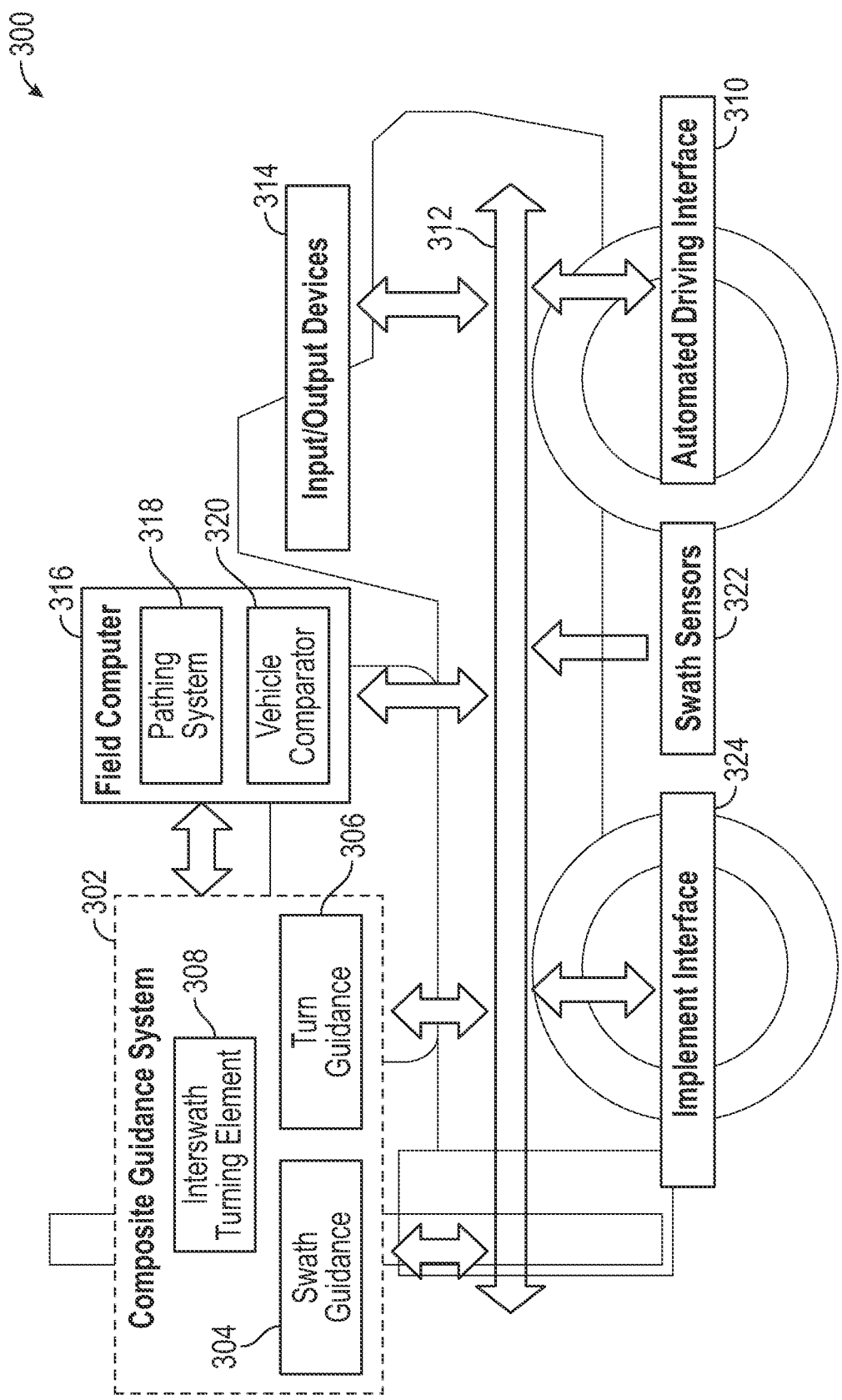
FIG. 3 is a schematic diagram of one example of an autonomous guidance assembly including a composite guidance system.

As described herein, a guidance assembly 300 is described including a composite guidance system 302 (see FIG. 3). The composite guidance system 302 provides selective guidance and corresponding automated driving control of the agricultural vehicle while driving along a swath and while conducting turning operations from a first swath to a next swath. The composite guidance system 302 enhances automated turning of the agricultural vehicle 140 from preceding to forthcoming swaths and is adaptable to turn the vehicle from a first swath to a transverse second swath that crosses the first swath (usually in a virtual manner).

Figure 2A:
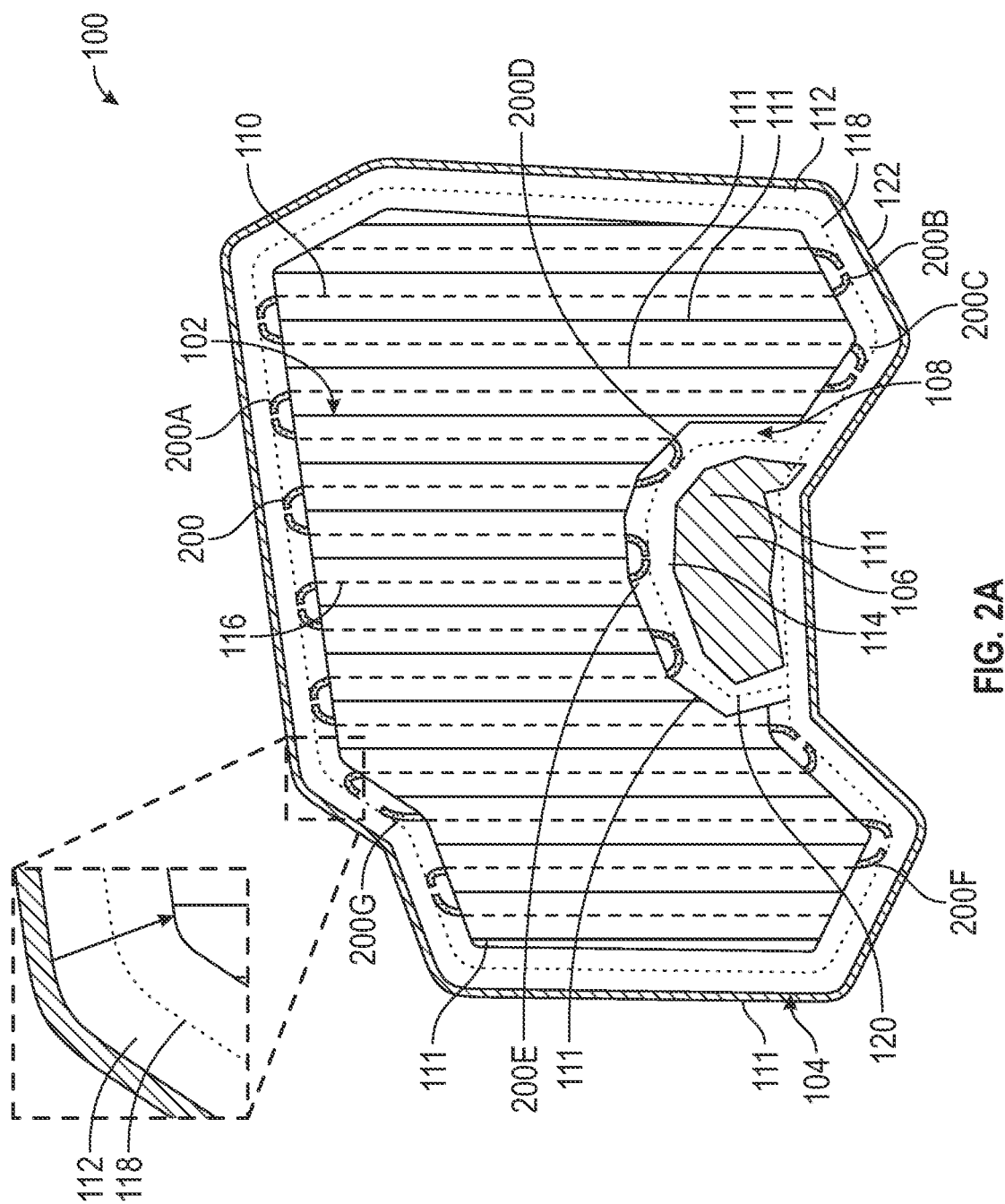
FIG. 2A is a schematic diagram of the field of FIG. 1A including swaths and composite turns interconnecting swaths.
Figure 2B:
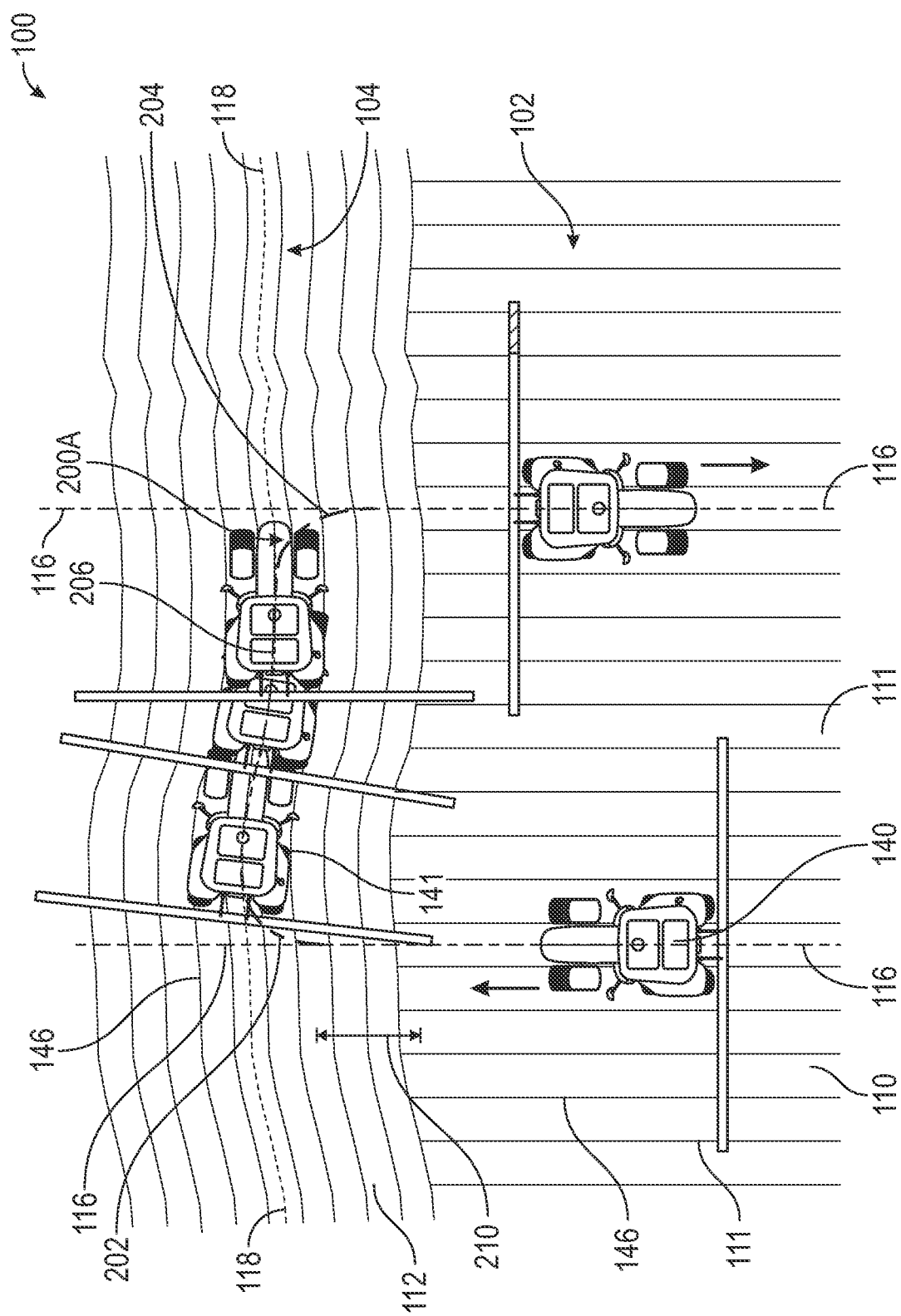
FIG. 2B is a detailed view of the portion of the field of FIG. 2A showing one example of a composite turn including one or more turn segments.

Examples of guidance and corresponding automated driving of the agricultural vehicle 140 with the guidance assembly 300 and the composite guidance system 302 are shown in FIGS. 2A, 2B. In these examples, the field 100 of FIG. 1A is shown again, but with independently generated composite turns that enhance turning of the agricultural vehicle 140 between swaths 110, 112, 114 in a manner that minimizes vehicle collisions (with obstacles, crops or the like), minimizes crop overrunning and damage, and at the same time ensures the agricultural vehicle is driven in an automated manner from a first swath to a proximate (next swath).

Referring first to FIG. 2A, the field 100 is shown with the swaths 110, 112, 114 in the example field zones 102, 104, 108. In this example, the field zone 102 includes swaths 110 having a generally (though not necessarily) straight linear profile. The field zone 104 in this example corresponds to the head row or headlands of the field 100 and includes one or more swaths 112 extending around the first field zone 102. The third example field zone 108 extends around the obstacle 106, a body of water. The field zones 102, 104, 108 are illustrative, and in other examples, each may include a variety of swaths (e.g., having different orientations, angles, profiles or the like) that are navigable with the guidance assembly examples described herein.

As further shown in FIG. 2A various composite turns 200 are provided between swaths. For instance, the agricultural vehicle 140 (e.g., a seeder, planter, sprayer, spreader, cultivator, harvester, mower or the like) is automatically driven through the field 100 along and between the swaths 110, 112, 114. As the agricultural vehicle 140 transitions from a first swath to a second (proximate) swath the guidance assembly 300 (discussed herein) hands off control of the agricultural vehicle 140 from swath guidance to turn guidance. The guidance assembly 300 applies a turn profile between the first and second swaths (e.g., 110, 112), determines a departure location from the first swath and an arrival location at the second swath, and then conducts an automated turn with the agricultural vehicle following the portion of the turn profile between the departure and arrival locations.

As shown in FIG. 2A, and shown in greater detail in FIG. 2B, composite turns 200 are thereby generated that guide the automated turning in an efficient manner that rapidly transitions the vehicle from the first swath 110 to the next swath 112, 114 (e.g., in this example in the head row or proximate the obstacle 106), and then from the swath 112, 114 to a first proximate (next) swath 110. Various examples of composite turns, and their independent profiles relative to other composite turns, are shown in FIG. 2A as composite turns 200A, B, C, D, E, F and so on. As shown, the component turns of the composite turns 200 vary in profile (shape, radius, size, length or the like) according to the swaths 110, 112, 114 that the component turn begins from (departs) and ends with (arrives).

Referring now to FIG. 2B the agricultural vehicle 140 is shown again while transitioning from a first example swath 110 to a second example swath 112, and from the second example swath to another first swath 110 proximate to the initial first swath 110. As shown, the agricultural vehicle 140 covers the swath 110 from swath edge to swath edge 111, 111, and does so with the ground engaging elements 141 positioned between crop rows 146. In one example, the composite guidance system 302 of the guidance assembly 300 operates the agricultural vehicle 140 according to a swath guidance system 304 that uses one or more sensors (e.g., visual, ultrasound, radar, mechanical, global positioning, real time kinematics or combinations of the same) to guide travel of the vehicle 140 to maintain the ground engaging elements 141 between the crop rows 146, minimize crop damage, and at the same time provide the specified agricultural operation across the swath 110.

A composite turn 200A is shown in FIG. 2B and represents an example composite turn like the turns 200A-F shown in FIG. 2A. As shown in FIG. 2B the composite turn 200A includes two or more components. For example, the composite turn 200A includes a turn segment 202, a swath segment, and (in this example) another turn segment 204. The composite turn has an independently generated (and in some cases unique) turn profile in comparison to the specified profiles shown in in FIGS. 1A, B. As described herein, the turn segments 202, 204 are generated with a turn profile that is married to two or more of the swaths 110, 112 to provide swath departure and arrival locations as well as the intervening turn segment. The swath segment 206 shown between the turn segments 202, 204 is conducted through handing off control from a turn guidance system (in the turn segments) to a swath guidance system. Conversely, at the turn segment 204 control is handed from the swath guidance system to the turn guidance system (and returned to the swath guidance at the second instance of the first swath 110). While the agricultural vehicle is controlled with the swath guidance system it follows the contour of the swath 110, 112, for instance a guidance line 116, 118, swath edge 111 or the like.

The generation of turn segments as discussed herein independently provides turn segments that are based on the preceding and forthcoming swaths 110, 112 (in FIG. 2B) and accordingly account for variations in the swaths 110 such as angles, curves, contours or the like that may otherwise affect generic consistent turn profiles that fail to account for these variations. Further, the toggling (e.g., switching, selection, engagement/disengagement, prioritization or the like) of turn guidance and swath guidance facilitates the seamless handoff between turn and swath-based guidance without operator intervention. Additionally, including a swath segment 206 in the composite turn 200A (or the other examples shown in FIG. 2A) ensures the agricultural vehicle is quickly guided to position the ground engaging elements 141 between crop rows 146. The swath segment 206 and associated positioning of the ground engaging elements 141 between crop rows is thereby maintained until the next turn segment 204 (in this example) begins. At that point turn guidance is toggled to a higher priority as the agricultural vehicle conducts the turn segment 204. As shown in FIG. 2B in comparison to FIG. 1B the agricultural vehicle 140 transitions from the first swath 110 to the first (proximate) swath in both examples. However, in FIG. 2B with the composite turn 200A including one or more turn segments 202, 204, swath segments 206 or the like the agricultural vehicle crosses over significantly less crop rows 146 and is instead actively guided in the swath segment 206 (as shown with the ground engaging elements 141) to minimize overrunning of the crop rows 146.

FIG. 3 is a schematic view of one example of a guidance assembly 300 configured to autonomously drive an agricultural vehicle, such as the vehicle 146 previously shown in FIGS. 1A-2B. In one example, the guidance assembly 300 is an automated control system or component of an automated control system configured to operate the agricultural vehicle for one or more of driving or agricultural operations within a field. As shown in FIG. 3, the guidance assembly 300 includes a number of components interconnected with one or more interfaces, such as the interface 312. The interface 312 includes, but is not limited to, one or more of a bus, CAN bus, wiring, wireless connections or the like to provide communication between one or more elements of the guidance assembly 300.

As further shown in FIG. 3, the guidance assembly 300 includes a composite guidance system 302 configured to guide the vehicle (e.g., including automated driving) with swath and turn based guidance. As shown in FIG. 3, the composite guidance system 302 includes a swath guidance system 304 and a turn guidance system 306. An interswath turning element 308 is provided to toggle the composite guidance system 302 between each of the swath and turn guidance systems 304, 306. As described herein, toggling includes, but is not limited to, one or more of exchanging, handing off, changing, switching, prioritizing, reprioritizing, pausing, engaging or disengaging one or more of the guidance systems 304, 306. In one example, toggling does not include the actual deactivation of one or more of the swath or turn guidance systems 304, 306. Accordingly, in an example including the swath guidance system 304 as the active guidance type, the turn guidance system 306 is, in one example, paused, for instance, reprioritized to a lesser priority relative to the swath guidance system 304. Conversely, in another example, while the turn guidance system 306 is active the swath guidance system 304 is 'paused' and one or more features of the swath guidance system 304 (e.g., sensors, positioning systems or the like) are available for use with the turn guidance system 306.

Referring again to FIG. 3, the guidance assembly 300, in this example, further includes a field computer 316 such as a computer, tablet or the like associated with the vehicle (directly or indirectly) that facilitates diagnostics and control of the vehicle. Optionally, the field computer 316 includes a pathing system 318. In one example, the pathing system 318 provides an array of swaths for a field, such as the swaths 110, 112, 114 previously shown in one or more of FIGS. 1A, 2A. The swaths are, as described herein, used to facilitate driving and operation of the vehicle 146 along one or more crop rows, within crops or the like of the field 100. In one example, the swathing system 318, and an array of swaths generated by or retained by the system 318, is used with the composite guidance system 302 to conduct one or more of swath guidance, turn guidance or the like.

In another example, the field computer 316 includes a vehicle comparator 320. In one example, the vehicle comparator 320 monitors the vehicle location, for instance, by way of one or more of global positioning system (GPS) indexing, real time kinematics (RTK) indexing or the like. The vehicle comparator 320 compares the vehicle location relative to one or more of the swaths (or features of the swaths as described herein), or relative to turns or turn segments. The vehicle comparator 320 additionally indexes the vehicle location relative to one or more swath departure and arrival locations or the like to initiate turn guidance, automatically conduct a turn, and complete the turn and return to swath guidance.

As further shown in FIG. 3, the guidance assembly 300 optionally includes one or more input or output devices 314. These devices include, but are not limited to, keyboards, touchscreens, displays, haptic feedback systems, components or the like that facilitate input and output to the assembly 300. In one example, the input and output devices 314 include one or more touchscreen interactive features, for instance, provided with the field computer 316. Optionally, the input or output devices 314 permit interaction with one or more of the pathing system 318 and composite guidance system 302. An operator may accordingly modify swaths (e.g., guidance lines or the like) to account for obstacles, changes in an agricultural operation or the like and stored with the pathing system and accessible by the composite guidance system 302. Optionally, the input or output devices 314 permit access to one or more features of the composite guidance system 302, for instance to set or modify one or more of agricultural vehicle characteristics, field characteristics, turn profiles (for generation of turn segments) or the like.

Referring again to FIG. 3, the guidance assembly 300 includes, in another example, an implement interface 324. In one example, the implement interface 324 includes one or more of mechanical, electromechanical, electrical or wireless interfaces of the vehicle such as the vehicle 146 with one or more components of an agricultural implement such as, but not limited to, a sprayer boom, harvester head, row sections of a planter, seeder or the like to facilitate the control of the agricultural implement. For instance, in one example, the implement interface 324 facilitates the control of the sprayer booms, including sprayer nozzles, injection, and concentration control of injection products to carrier fluids, control of row sections of planting units, the operation of harvester heads including the elevation of the harvester head relative to the ground or crops, or the like.

In another example, the guidance assembly 300 includes an automated driving interface 310 that provides the mechanical, electromechanical, electrical or wireless interface with other control systems of the agricultural vehicle that control the vehicle driving functions. For instance, the various control systems include one or more of steering, acceleration or deceleration, throttling, breaking, shifting or the like. In other examples, the automated driving interface 310 includes one or more components otherwise previously described as components of the implement interface 324 including those interfaces configured for operation of an implement coupled with the agricultural vehicle. The automated driving interface 310 provides an electronic interface with the guidance assembly 300 including, for instance, the composite guidance system 302. Accordingly, one or more of swath guidance, turn guidance or the like provided by the composite guidance system 302 are implemented through the automated driving interface 310 to one or more of steering, acceleration or deceleration, breaking, shifting controls or the like.

In another example, the guidance assembly 300 includes one or more swath sensors 322 associated with the agricultural vehicle. The swath sensors 322 include sensors configured to detect one or more swaths, including features of swaths (e.g., of the swath itself, crops, crop rows, virtual features of the swaths such as guidance lines or the like). Swath sensors 322 include, but are not limited to, radar, LIDAR, ultrasound, optical (camera or video) sensors and associated signal or image processing algorithms configured to interpret sensed information from the swath sensors 322. In one example, the swath sensors are used with the swath guidance system 304 to facilitate steering of the agricultural vehicle, for instance, within one or more swaths such as the swaths 110, 112, 114. In one example, the swath sensors, including one or more of radar, ultrasound or visual sensors, are configured to cooperate with the swath guidance system 304 and the automated driving interface 310 to position one or more ground engaging elements such as wheels, tracks, runners or the like between crop rows, such as the crop rows 146 shown in FIGS. 1B, 2B.

Figure 4A:
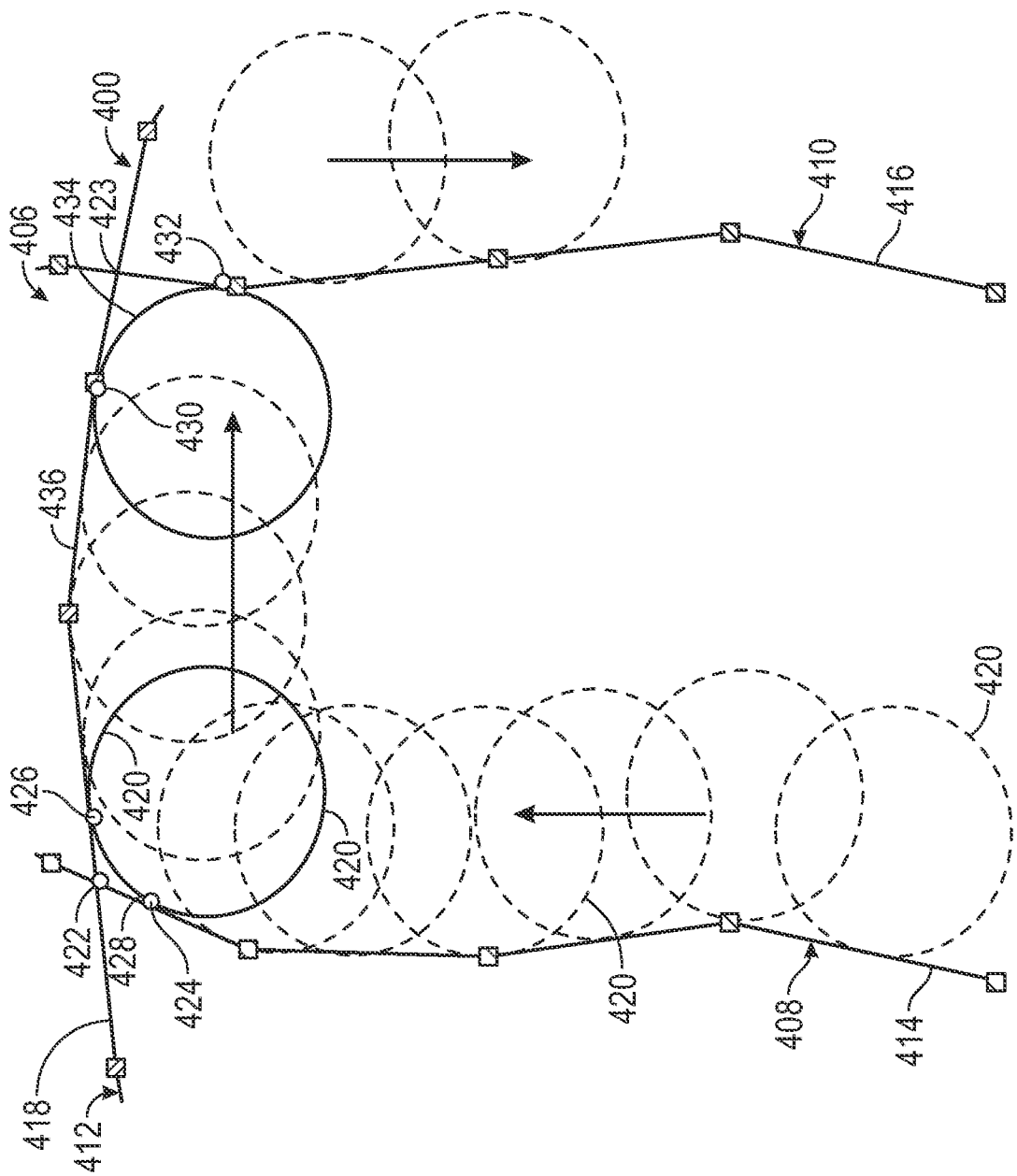
FIG. 4A is a schematic diagram of the generation of one example of a turn segment and composite turn shown in FIG. 2B.
Figure 4B:
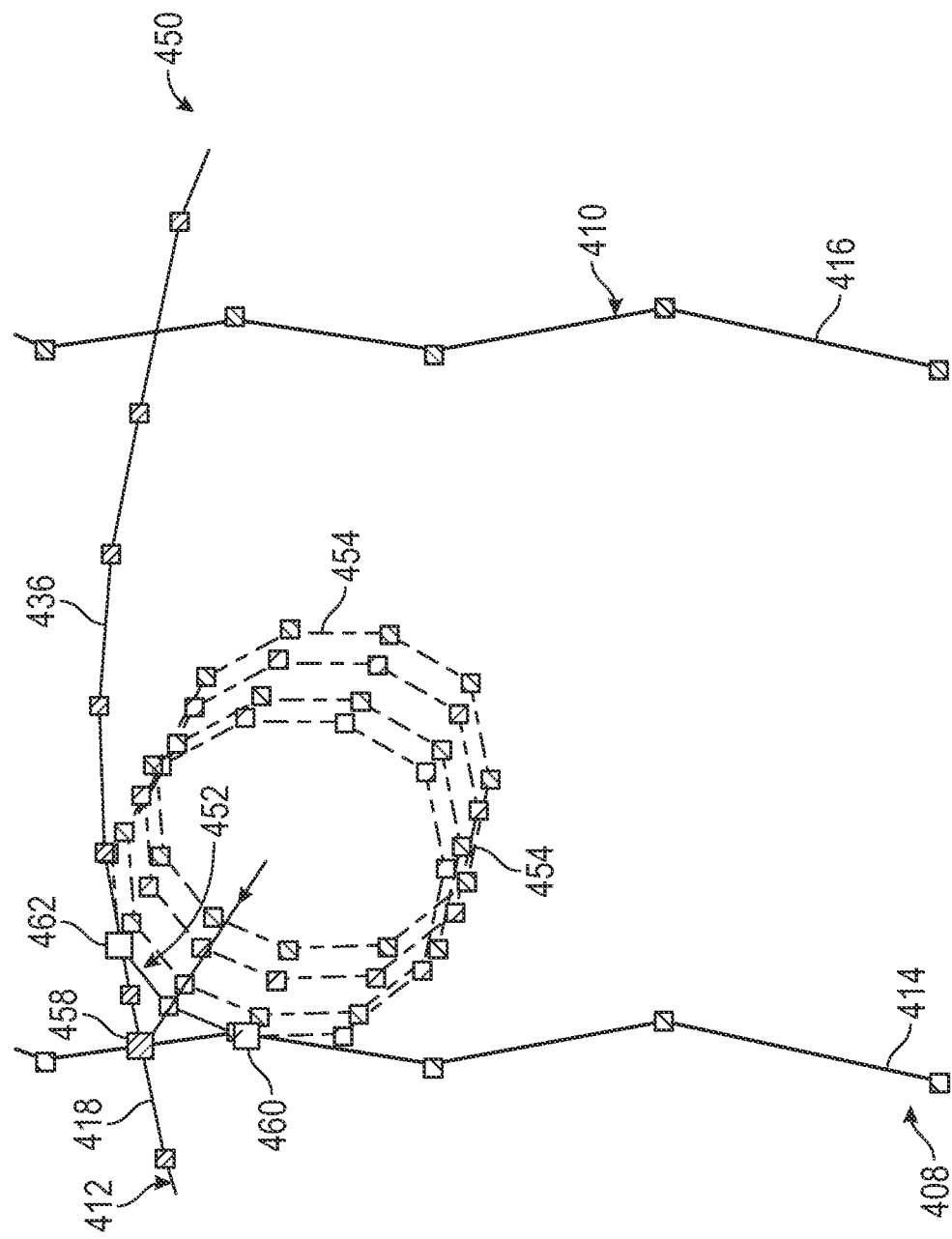
FIG. 4B is a schematic diagram of the generation of another example of a turn segment.

FIGS. 4A and 4B show examples of turn generation. In the example shown in FIG. 4A, one example of turn generation 400 includes one or more turn segments such as the turn segments 428, 434 of an example composite turn 406. FIG. 4A illustrates multiple example swaths including a first zone swath 408, a first zone proximate (next) swath 410 and an intermediate or second zone swath 412. In the example shown in FIG. 4A, the first zone swath 408 and the first zone proximate (next) swath 410 are swaths associated with a first zone of a field such as the field 100, and have a generally parallel or similar orientation. Conversely, the second zone swath 412 has a dissimilar orientation, and is for example transverse relative to the first swaths 408, 410 (e.g., having an orientation that crosses or extends across the first swaths).

As further shown, the swaths 408, 410, 412 are represented in this schematic view with one or more associated guidance lines 414, 416, 418, respectively. In one example, the guidance lines 414, 416, 418 represent one or more planned routes, preceding paths of previously passing vehicles or the like used with the composite guidance system 302 including, for instance, the swath guidance system 304 to guide the agricultural vehicle, for instance, along one or more of the swaths 408, 410, 412. In the example shown in FIG. 4A, the guidance lines 414, 416, 418 extend virtually, for instance, beyond the ends of their respective swaths. Referring to FIGS. 1B, 2B, the guidance lines 116, 118, shown in those respective figures, are shown extending past the ends of the associated swaths 110. In a similar manner, the guidance lines 414, 416 extend virtually beyond the respective ends of their associated swaths 408, 410. As described herein, the guidance lines 414, 416, 418 are used, in one example, to generate one or more turn segments, for instance, turn segments 428, 434 as part of the turn generation 400 shown, for instance, in FIG. 4A.

An example turn profile 420 is shown in FIG. 4A at multiple locations along the guidance lines 414, 416, 418. In one example, the turn profile 420 is a turn shape including both a contour and one or more dimensions such as a radius, length, eccentricity, or the like. The turn profile is, as described herein, moved toward an intersection of one or more of the swaths, for instance, illustrated in this example with intersections 422, 423 between the guidance lines 414, 416, 418. In the example shown in FIG. 4A, the turn profile 420 is moved along the guidance lines 414 toward the intersections. In one example, the agricultural vehicle is scheduled or prescribed to move along the guidance line 414 of the first zone swath 408 toward the second zone swath 412 and its associated guidance line 418. The agricultural vehicle will then move along the second zone swath 412 toward the first zone proximate (next) swath 410 and transition to the first zone proximate swath 410 shown in the right FIG. 4A. In this example, the turn profile 420 is moved in a similar manner along the guidance lines 414, 416, 418 to generate the turn segments described herein. In one example, the portions of the turn profile that are moved along the guidance lines and intersect with various portions of the guidance lines are used to generate the respective turn segments 428, 434 between the associated guidance lines. The portion of the turn profile 420 extending between, for instance, a swath departure location 424 and a swath arrival location 426 corresponds to the turn segment used by the agricultural vehicle to accordingly transition from the first zone swath 408, in one example, to the second zone swath 412.

Referring again to FIG. 4A, in operation, the turn profile 420, in this example, a circle, ellipse or the like, is translated along the guidance line 414 either as the agricultural vehicle is moving with the virtual turn profile 420 or in a preplanned manner, for instance prior to operation of the vehicle within a field. As the turn profile 420 is moved toward one or more of the swath intersections 422, 423 the composite guidance system 302 (e.g., the turn guidance system 306) indexes the location of the turn profile 420 along the guidance line 414 and identifies intersections between the turn profile 420 and the respective guidance lines 414, 418.

As shown in FIG. 4A, the turn profile 420 is moved toward the swath intersection 422 along the guidance line 414. Proximate to the swath intersection 422 the turn profile 420 intersects (e.g., touches, engages, crosses or the like) with the guidance line 418. At the dual intersection of the turn profile 420 with the guidance line 414 and the guidance line 418, the turn profile 420 is virtually coupled between the guidance lines 414, 418. For instance, as shown in FIG. 4A, a swath departure location 424 is located at the intersection of the turn profile 420 with the guidance line 414 where the turn profile tangentially intersects the guidance line 414. Similarly, a swath arrival location 426 is shown where the turn profile 420 intersects (e.g., touches, engages, crosses or the like) the guidance line 418. The intervening turn segment 428 of the turn profile 420 extending between the swath departure location 424 and the swath arrival location 426 corresponds to one turn segment of the composite turn 406 shown in FIG. 4A. In one example, a component of the turn guidance system 306, such as an intersection element 610, indexes the swath departure location 424 and the swath arrival location 426 and also indexes the turn segment extending between the swath departure location 424 and the swath arrival location 426 to provide a generated or planned turn segment 428 to turn the agricultural vehicle from the guidance line 414 and the associated first zone swath 408 to the guidance line 418 associated with the second zone swath 412.

In operation, the agricultural vehicle moves along the first zone swath 408, for instance, along the guidance line 414 and toward the second swath 412 having the associated guidance line 418. The vehicle approaches the swath departure location 424. After determination with the vehicle comparator 320 that the agricultural vehicle has arrived at the swath departure location 424, guidance is handed off or toggled from the swath guidance system 304 to the turn guidance system 306. The agricultural vehicle conducts a turn, for instance, along the turn segment 428 toward the swath arrival location 426 based on control from the turn guidance system 306. In one example, the location of the vehicle monitored in an ongoing manner, for instance, with the vehicle comparator 320.

Upon arrival of the vehicle at the swath arrival location 426 (determined with the vehicle comparator 320) the interswath turning element 308, triggers handing off of guidance control from the turn guidance system 306 to the swath guidance system 304. The agricultural vehicle then engages in driving along the swath segment 436 of the second swath 412 between the first zone swath 408 and the first zone proximate (next) swath 410 shown in FIG. 4A. As previously described, in one example the swath guidance system 304 uses one or more swath sensors to guide the agricultural vehicle along the second zone swath 412. The swath guidance system 304 positions one or more of the ground engaging elements of the agricultural vehicle between crop rows and thereby minimizes overrunning and damage to crops within the swath segment 436. The agricultural vehicle continues along the swath segment 436 guided by the swath guidance system 304.

As shown in FIG. 4A, the example (second) turn segment 434 includes a component of the turn profile 420 extending from the swath departure location 430 along the guidance line 418 and the swath arrival location 432 provided along the guidance line 416. In a similar manner to the previously described generation of the turn segment 428, in one example, the turn profile 420 is directed along one or more of the guidance lines, in this example, along the guidance line 418 toward the guidance line 416 of the first zone proximate swath 410. At the intersection of the turn profile 420, with each of the guidance lines 418, 416, the swath departure location 430 and swath arrival location 432 are indexed, for instance, with the intersection element 610 shown in FIG. 6A. The intersections between the turn profile 420 and the guidance lines 418, 416 are determined with one or more mathematical or graphical analyses including detection of tangent intersections, crossing of the guidance lines by the turn profile 420 or the like.

Figure 5:
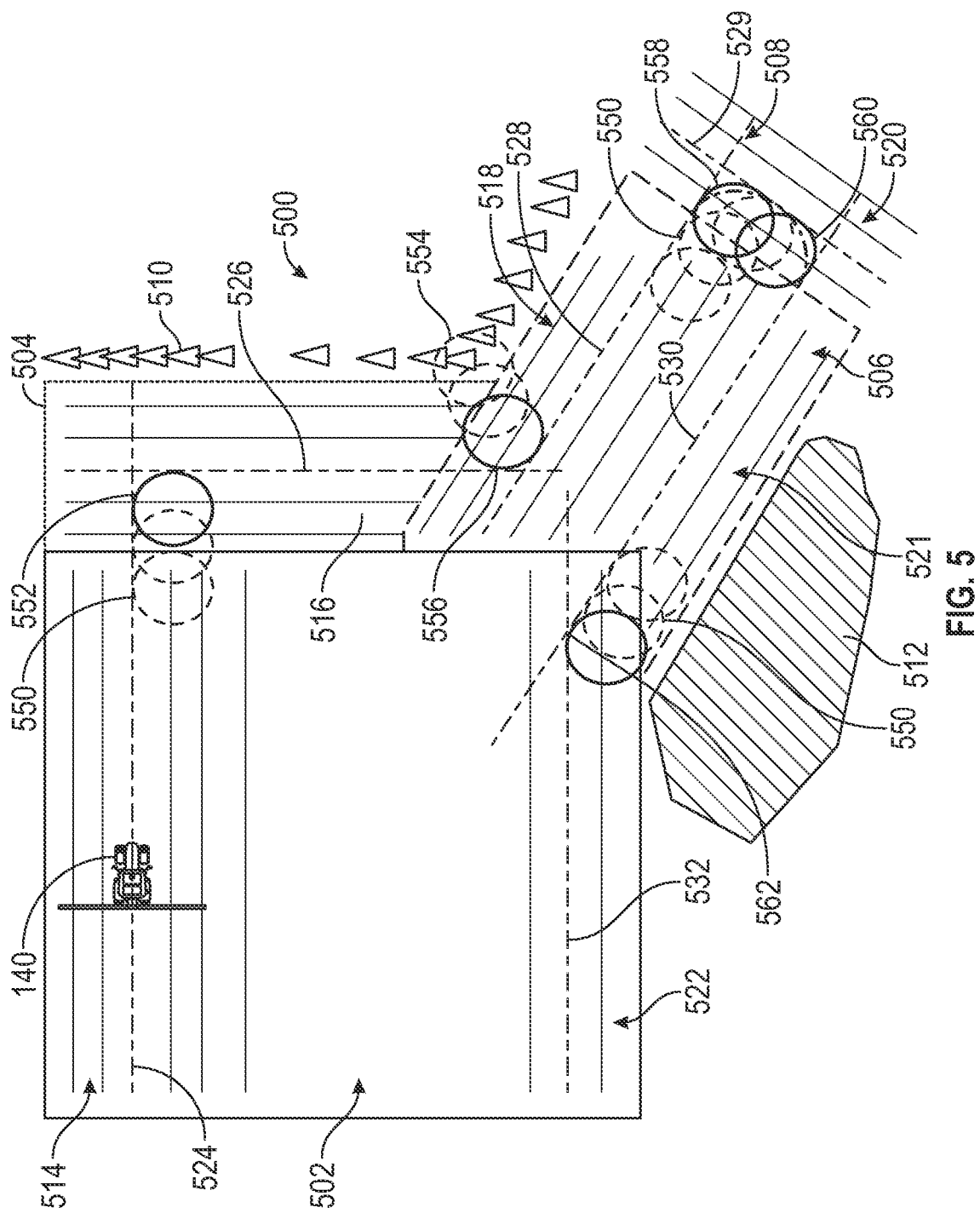
FIG. 5 is a plot of a portion of a field including a plurality of swaths and interconnecting turn segments.

A turn segment 434 of the turn profile 420 extends between swath departure location 430 and the swath arrival location 432. Upon reaching the swath departure location 430 of the next turn segment 434, the interswath turning element 308 toggles control again from the swath guidance system 304 to the turn guidance system 306. In one example, the toggling and corresponding activating and pausing of control systems is repeated as the vehicle travels along the swaths in the field and arrives at and conducts one or more turns, and then returns to travel along swaths. FIG. 4A shows one example of a composite turn 406 including plural turn segments and an intervening swath segment 436. In other examples, the guidance assembly 300 described herein facilitates driving along swaths with intervening turn segments (without intervening swath segments), for instance as shown in FIG. 5.

As further shown in FIG. 4A, in one example, the handedness of the turn and corresponding direction of the turn profile 420 on the left or right sides along the associated guidance lines 414, 416, 418 changes based on a preplanned route or real-time election (e.g., operator election, automated election, or the like of a left or right turn) that decides the handedness of the turn profile 420. In an example, the handedness of the turn profile 420 is optionally determined based on one or more of the swaths in a field zone, a starting location or ending location of the vehicle for an agricultural operation, prioritization of swaths and field zones through user selection or automated coverage algorithms, or by convention (for instance, after two right turns, the next two turns are left turns, a similar pattern or the like).

As shown in FIG. 4A, in one example, the turn profile 420 has a common shape, for instance, a circular shape having a set radius, dimensions or the like. The corresponding turn segments 428, 434 are based on the turn profile 420 but independently generated according to the intersection between the turn profile 420 with the associated guidance lines 414, 418, 416. Accordingly, each of the turn segments are accordingly independently generated and based on the associated swaths 408, 410, 412 (e.g., their associated guidance lines). In other examples, the turn profile 420 is optionally modified, for instance, with a turn modification element such as the virtual turn profile element 606 shown, for instance, in FIG. 6A. In various examples, the turn profile 420 is modified according to changes in one or more characteristics of the turn profile, such as, diameter, shape or the like based on one or more field characteristics or vehicle characteristics. Example field characteristics for changing the turn profile 420 include, but are not limited to, spacing between swaths including spacing of one or more swaths, for instance, with staggered or multi-vehicle agricultural operations; fence or obstacle locations; collisions; culverts; unplanted zones, waterways and the like; or the like. In another example, the virtual turn profile element 606 modifies the turn profile 420 according to one or more vehicle characteristics. Vehicle characteristics include, but are not limited to, the acceleration or velocity in the vehicle at the turn including a vector for speed; maximum rated G-force for the vehicle; minimum turning radius for the vehicle; vehicle or implement dimensions (kinematics); a specified implement clearance (distance) between the steering ground engaging elements and an agricultural implement to delay initiation of a turn and minimize crop damage; maximum curvature rate for the ground engaging elements such as the wheels, tracks or the like (e.g., in degrees per meter per second). For instance, in one example, the turn profile 420 is enlarged at higher velocities in order to graduate turns and minimize the risk of tipping. In another example, the turn profile 420 is compressed if the vehicle approaches a turn with a relatively lower velocity to facilitate tighter turns and further minimize crop overrunning. In another example, the turn profile 420 is elongated along the second zone swath 412 (in the manner of a right to left elongated oval) to minimize the risk of collision between the implement of the vehicle and one or more obstacles associated with the second zone swath 412, for instance, a proximate fence, post, buildings or the like.

FIG. 4B shows another example of turn generation 450 including the generation of a turn segment 452. In a similar manner to FIG. 4A, FIG. 4B shows first and second zone swaths 408, 412 as well as a first zone proximate (next) swath 410. Each of the zone swaths includes associated guidance lines 414, 416, 418 representing, in one example, the swaths themselves and, in another example, guidance lines for automated driving along the swaths 408, 410, 412.

In the example shown in FIG. 4B, another example of a turn profile 454 is shown including component elements, such as a plurality of interconnected component elements. In this example, the interconnected elements of the turn profile 454 include linear elements. In other examples, the elements include, but are not limited to, linear elements, arcuate elements or the line.

The turn profile 454 is moved toward the swath intersection 458 and, in this example, is moved along a different vector relative to the first zone swath 408 (in contrast to FIG. 4A). Instead, the turn profile 454 is moved along a different vector toward the swath intersection 458 and is not aligned with one of the swaths or the associated guidance lines. In one example, the turn profile 454 is moved in a graduated manner beginning at a specified offset from the swath intersection 458 and is thereafter moved in a direction approaching the intersection 458. The 454 is gradually moved toward the intersection until one or both of the first or second swaths 408, 412 are intersected. Optionally, the turn profile is 'backed off' from the intersection and approaches the intersection at a smaller graduation to refine marriage of the turn profile 454 to the swaths, for instance, the guidance lines 414, 418. In one example, the refined marriage of the turn profile 454 to the guidance lines 414, 418 minimizes the discontinuity between the turn profile 454 and the guidance lines 414, 418, and thereby minimizes a disjuncture between the resulting turn segment 452 and either or both of the guidance lines 414, 418.

Figure 6A:
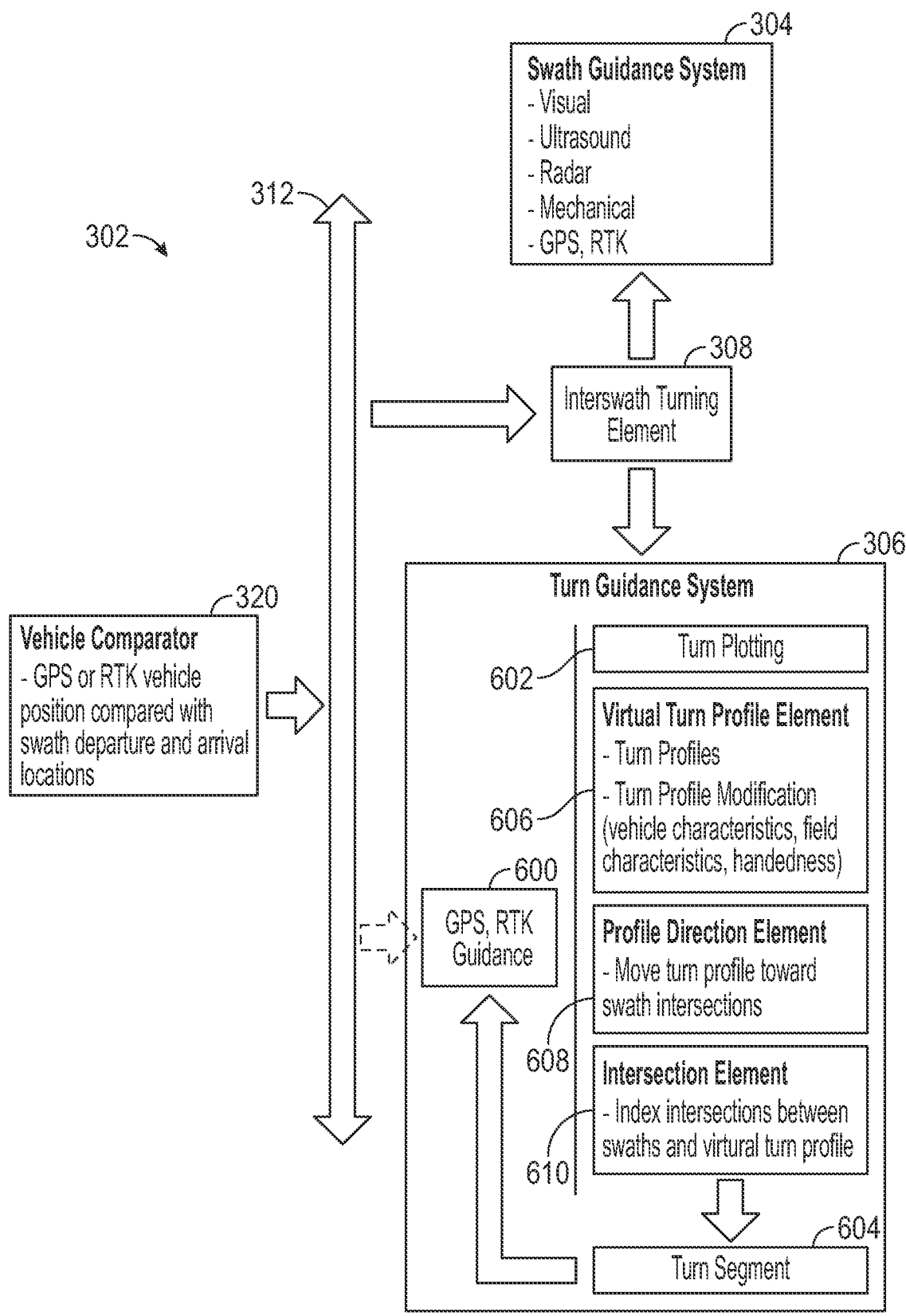
FIG. 6A is a schematic diagram of another example of a composite guidance system.

The intersections of the turn profile 454 with the guidance lines 414, 418 are detected with the guidance assembly 300, for instance with the intersection element 610 shown in FIG. 6A. The guidance assembly 300 detects the intersection through mathematical or graphical analysis of the turn profile and guidance lines, and detects one or more of tangential intersection or crossing of the turn profile 454 with the guidance lines. The detected intersections are indexed as start and end locations of the corresponding turn segment 452. For instance, in one example, a start location corresponds with the swath departure location 460 and corresponds to the intersection of the turn profile 454 and the guidance line 414. Conversely, the end location of the turn segment 452 corresponds to the swath arrival location 462 and intersection of the turn profile 454 and the swath 412. The turn segment 452 thereby includes that portion of the turn profile 454 extending between the index swath departure location 460 and the swath arrival location 462.

In one example, the direction of the turn profile 454, for instance, along the vector toward the swath intersection 458 is, in one example, repeated for other turns contained with the pathing system 318 (e.g., with the field computer 316). Accordingly, turn segments are generated for each transition from a first swath to a proximate (next) swath based on intersections of the turn profile 454 with each of the component swaths. Stated another way, in one example the turn guidance system 306 directs the turn profile 454 (or 420 in FIG. 4A) toward swath or guidance line intersections and automatically generates turn segments if the turn profile intersects with each (both) of the swaths or guidance lines proximate to the intersection.

In still other examples, the turn profile 454 or the turn profile 420 described herein are directed in differing fashions according to the preferences of the operator, one or more automatic thresholds or the like. For instance, the turn profile 454 is, in one example, moved in the translational manner, for instance, along one more of the guidance lines as shown in FIG. 4A or moved diagonally as shown in FIG. 4B depending on the circumstances of the guidance lines 414, 418, 416 or the corresponding preferences of the operator. In another example, the turn profile 420, shown in FIG. 4A, is, in one example, moved in the diagonal or misaligned fashion (relative to guidance lines) shown in FIG. 4B.

In a similar manner to the turn segment shown in FIG. 4A, after completion of the operation or driving of the agricultural vehicle from the turn segment 452 to an oncoming additional second zone swath 412, the agricultural vehicle transitions, for instance, by way of switching of guidance systems to the swath guidance system 304 to drive along the swath segment 436. In FIG. 4B as the vehicle approaches the intersection of the second guidance line 418 and the first proximate (next) guidance line 410 the vehicle engaging in another turn operation, for instance, with a turn segment generated with the turn profile 454 and intersections with the guidance lines 418, 416.

Although the example turn segments in FIGS. 4A, 4B are generated with the turn profile and one or more guidance lines 414, 418, 416 the turn segments are in other examples generated with other elements of the swaths 408, 412, 410, respectively. For example, the guidance assembly 300 optionally includes one or more swath sensors 322 as described herein, and further shown in FIGS. 8-10B. The swath sensors 322 detect one or more elements of swaths including, but not limited to, swath edges, crop rows or the like. In another example, the turn guidance system 306 is in communication with the swath sensors 322 and applies a turn profile (as described herein) to the sensed swaths (e.g., the detected swath edges, crop rows within the swath or the like) to determine the swath departure and arrival locations and the intervening turn segment. In this example, the swath departure and arrival locations correspond to locations along the sensed swath element, such as the crop row or swath edge (in contrast to along guidance lines of the swath) and the departure and arrival locations are accordingly indexed to these features instead of the guidance lines. The resulting turn segment accordingly extends between the departure and arrival locations along the respective swath features. As an illustrative example, if swath guidance (e.g., with the system 304) is conducted based on the detected crop rows between the ground engaging elements 802 in FIG. 8 the generation of turn segments is similarly conducted on one or more of the detected crop rows. A forward looking swath sensor 806 (or 906) identifies the corresponding crop rows of the forthcoming (transverse) swath, and the turn guidance system 306 thereby determines the swath departure location from the detected crop rows of the current swath and the swath arrival location from the detected crop rows of the forthcoming swath. The associated turn segment corresponds to the portion of the turn profile between the determined swath departure and arrival locations. In other examples, the turn guidance system 306 uses other sensed features of swaths for generating turn segments including, but not limited to, obstacles, obstacle perimeters, headlands or the like associated with preceding and forthcoming swaths.

FIG. 5 is a schematic example of a field 500 including a variety of field zones and associated swaths for automated driving, for instance, by the agricultural vehicle 140 shown in FIG. 5. As shown in FIG. 5, the field 500 includes a first field zone 502, a second field zone 504, a third field zone 506 and a fourth field zone 508. Field zones 502-508 are provided as exemplary indicators of different portions of the same field, different fields or the like and include, in this example, corresponding swaths having different orientations relative to other portions or zones of the field 500. As further shown in FIG. 5, the swaths, such as the swaths 514, 516, 518, 520, are oriented at different angles, have differing characteristics or the like relative to other swaths in the other field zones 502-508. In the example shown in FIG. 5, each of the swaths 514 include associated guidance lines, for instance, the swath 514 associated with the first field zone 502 has an associated guidance line 524 while the swath 516 provided in the second field zone 504 has an associated guidance line 526. In a similar manner, the third field zone having the swaths 518, 521 has associated guidance lines 528, 530. The fourth field zone 508, including the swath 520, includes the guidance line 529.

In the example shown in FIG. 5, the agricultural vehicle 140 is shown moving through the field 500 in an automated fashion swath guidance and turn guidance conducted with the swath guidance system 304 and the turn guidance system 306, respectively. As previously described, automated driving of the agricultural vehicle 140 is, in one example, accomplished between these guidance systems with the interswath turning element 308 configured to toggle or hand off control of automated driving of the agricultural vehicle 140 between the swath guidance system 304 and the turn guidance system 306.

As shown in FIG. 5, one or more turn profiles 550, 554 are applied to the swaths (and intersections between transverse swaths) to accordingly generate one or more corresponding turn segments such as the turn segments 552, 556 and so on. In the example shown in FIG. 5, the turn profile 550 is directed along the guidance line 524 toward an intersection between the guidance line 524 and 526. The intersection of the turn profile 550 with the guidance lines 524, 526 provides the swath departure and arrival locations and the associated turn segment 552 is the intervening portion of the turn profile 550 between the departure and arrival locations in a manner corresponding to determination of the previously described departure and arrival locations for the turn segment.

In another example, the turn profile 550 is directed as the turn profile 554 is directed in FIG. 5, from a vector different than the orientation of the associated guidance lines (526, 528 for the profile 554), and toward an intersection of the guidance lines. In this example, also shown in FIG. 5, the turn profile 550 is directed toward the intersection between the guidance lines 526, 528 until the intersection therebetween is detected and the turn segment 556 is generated between the intersections of the turn profile 550 with the corresponding guidance lines 526, 528. As further shown in each of the turn segments 556, 558, 560, 562 in the field 500, the turn profile 550 (or profile 554) is moved toward intersections between the associated guidance lines to accordingly generate the turn segments for guidance of the agricultural vehicle 140 during the transition from swath guidance, for instance, along the various swaths provided in FIG. 5 and through the turn such as the turn segments 552, 556, 558, 560, 562. Optionally, the turn segments are generated automatically based on the detected intersections of swaths with transverse swaths (e.g., 524, 526; 526, 528; and so on). In another example, the turn segments are generated automatically based on composite intersections of the turn profiles with proximate swaths. For instance, upon a detected intersection of the turn profile with two swaths (including their associated guidance lines) a turn segment is generated.

The agricultural vehicle 140 is thereby able, in an automated fashion without operator intervention, to navigate through the field 500 including various swaths having differing orientations, intersections or the like using the turn profiles 550 or 554 (optionally modified according to one or more of vehicle characteristics, field characteristics or the like) while at the same time avoiding one or more obstacles such as obstacles 510, 512 or the like. Instead, the agricultural vehicle 540 readily and automatically transitions from swath guidance to turn based guidance using a composite guidance system 302 having the swath guidance system 304 and turn guidance system 306. At the same time, the agricultural vehicle 140 readily conducts the agricultural operation in a consistent fashion in each of the various field zones with their associated swaths while at the same time minimizing overrunning of crops, damaged crops or the like. Accordingly, an operator is thereby free to leave the agricultural vehicle 140 to fully automated operation or conduct monitoring operations of the agricultural vehicle 140 in a hands-off fashion and intervene only as necessary.

FIG. 6A shows a detailed schematic view of one example of the composite guidance system 302 previously shown and described in FIG. 3. As shown in FIG. 6A, the composite guidance system 302 includes, in this example, the vehicle comparator 320. In one example, the vehicle comparator 320 is a component of one or more other components of the guidance system 300 such as the field computer 316 previously shown in FIG. 3. In another example, the vehicle comparator 320 is a component of the composite guidance system 302. The vehicle comparator monitors the vehicle location and facilitates the comparison of the vehicle location relative to locations along the swaths, relative to swath departure and arrival locations, and along turns or turn segments. In one example, the vehicle comparator 320 includes, but is not limited to, a global positioning system (GPS), real time kinematics (RTK) system or the like configured to monitor the location of the vehicle relative to one or more way points including, for instance, way points along guidance lines, within swaths, departure or arrival locations from and to swaths (e.g., with intervening turn segments) or the like.

Referring again to FIG. 6A, the composite guidance system 602 includes the swath guidance system 304 as well as the turn guidance system 306 previously shown in FIG. 3. As shown in FIG. 6A the swath and turn guidance systems 304 communicate across one or more interfaces 312 including, but not limited to, a bus, CAN bus, wired connections, wireless connections or the like between the guidance systems. As further shown in FIG. 6A, the composite guidance system 302 further includes an interswath turning element 308. The element 308 is configured to toggle (e.g., exchange, hand off, change, switch, prioritize or the like) between swath and turn guidance, for instance, based on comparison of the vehicle position, for instance with the vehicle comparator 320, relative to swath departure and arrival locations corresponding to turn segment start and finish locations.

In one example, the swath guidance system 304 remains 'on' while the turn guidance system 306 is the active guidance system. For instance, the swath guidance system 304 is configured to make use of or includes a GPS or real-time kinematics system as an example swath sensor for position sensing. The turn guidance system 306 optionally uses one or more of these swath sensors to monitor progress through a turn and guide driving operations of the vehicle to match the turn segment. Accordingly, the swath guidance system 304 having these sensors remains 'on' (though not the higher priority system) even in a paused configuration, for instance, when the turn guidance system 306 has a higher priority or is engaged while the swath guidance system 304 is disengaged. In such an example, the swath guidance system 304, including the GPS or real-time kinematics system, remains active insofar as to facilitate monitoring of the agricultural vehicle position during driving operations, for instance, to detect the arrival or departure from one or more of the swath arrival location, swath departure location and progress of the agricultural vehicle, for instance, through one or more turn segments.

As shown in FIG. 6A, the composite guidance system 302 includes the swath guidance system 304. As previously described, the swath guidance system, in one example, is interconnected with one or more sensors, systems or the like configured to facilitate guidance of the agricultural vehicle, for instance, automated, driving within one or more swaths such as the swaths shown in one or more of the fields 100, 500, previously shown and described herein. Referring to FIG. 3, in one example, the swath guidance system 304 is interconnected with one or more swath sensors 322 including, for instance, one or more of visual, ultrasound, radar or mechanical sensors. As described herein, the swath sensors 322 are, in one example, configured to observe one or more features of the field 100, for instance, one or more of crop row positioning, crop row location or the like and accordingly facilitate determination of the location of the crop rows and provide this information to the swath guidance system 304, for instance, to accordingly position one or more ground engaging elements such as wheels, tracks, runners or the like between the crop rows to accordingly minimize overrunning and damage to the crops while at the same time ensuring conduct of the agricultural operation within a field, for instance, including one or more of spraying, cultivating, seeding or the like.

As further shown in FIG. 6A, the composite guidance system 302 includes the turn guidance system 306 as another guidance system in addition to the swath guidance system 304. Although the turn guidance system 306 is described, in this example, as a separate component to the swath guidance system 304, in another example, the swath guidance system and the turn guidance system are instead one or more of software modules, components or the like of a common guidance system such as the composite guidance system 302 and are readily toggled between as the active component guidance systems of the composite guidance system 302, for instance, with the interswath turning element 308.

As shown in FIG. 6A, in this example, the turn guidance system 306 includes one or more elements configured to generate one or more turn segments and facilitate automated driving of the agricultural vehicle according to the generated turn segments. The turn guidance system 306, in this example, includes a turn plotting element 602 configured to generate the turn segments and use the turn segments with the agricultural vehicle to accordingly conduct one or more turns. Referring again to FIG. 6A, in this example, the turn plotting element 602 includes a virtual turn profile element 606. In one example, the virtual turn profile element includes a catalog of various turn profiles including, but not limited to, circle, elliptical, almost square and square profiles as shown, for instance, in FIG. 7. Each of these catalogued turn profiles includes one or more variables that are optionally set with the virtual turn profile element as described herein. These variables include, but are not limited to, one or more of length, radius, profile (shape) or other characteristics, for instance, corresponding to geometric elements of the profiles. In another example, the virtual turn profile element 606 includes one or more sub-elements configured to provide turn profile modifications to the catalog turn profiles retained with the virtual turn profile element 606. As previously described herein, the turn profile modifications are configured to modulate a turn profile of the element 606 based on one or more of vehicle characteristics, field characteristics, handedness of the turn or the like.

Example field characteristics that the virtual turn profile element 606 modifies profiles with include, but are not limited to, spacing between swaths of zero or one or more intervening swaths, obstacle locations, known collisions, culverts, unplanted zones, waterways or the like. In a similar manner, vehicle characteristics used by the virtual turn profile element 606 to modify turn profiles include, but are not limited to, one or more of acceleration or velocity of the vehicle at or proximate to the turn (vector or speed (magnitude)), maximum rated G-force for the vehicle, operator or technician specified G-force for the vehicle, minimum turning radius for the vehicle, vehicle or implement dimensions (vehicle kinematics), maximum curvature rate for the ground-engaging elements (e.g., in units of degrees per meter per second) or the like. Optionally, a vehicle characteristic used by the virtual turn profile element 606 includes a specified implement clearance (distance) between the steering ground engaging elements and an agricultural implement to delay initiation of a turn and minimize crop damage. As shown in FIG. 2B with the vertical bracket, the specified implement clearance 210 delays the initiation of a turn based on a spacing that ensures the vehicle or the implement does not sweep through crops, for instance in the first swath 110. In one example, the specified implement clearance 210 corresponds to a distance from the turning (steerable) ground engaging elements 141 to the implement. Optionally, the specified implement clearance 210 modifies the turn profile to ensure the swath departure location (the intersection between the profile and the guidance line) is beyond a distal end of the specified implement clearance. In one example, the turn profile is modified to have a smaller radius that facilitates a tighter turn segment from the first swath to the second next (proximate) swath while at the same time satisfying the specified implement clearance 210.

In one example, the virtual turn profile element enlarges a turn profile (e.g., its radius is increased) at higher velocities to make more gradual turns to compensate for the higher velocity. In another example, at lower velocities as the vehicle approaches a turn, the turn profile is conversely compressed or shortened to facilitate a tighter turn because of the lower velocity. Optionally, another vehicle characteristic, such as the specified implement clearance 210 is an input with velocity, and the virtual turn profile 606 modifies the turn profile or the system 306 decreases the vehicle speed before conducting the turn (e.g., for instance to conduct a gradual turn while also achieving the specified implement clearance 210). In another example, the turn profile element 606 modifies the shape of the turn profile based on a forthcoming swath or field characteristic. For instance, if an obstacle is proximate to a forthcoming swath, such as a fence next to headland swath, the turn profile is optionally shortened in a direction crossing the next swath and elongated in a direction aligned with the next swath to minimize the risk of collision between the implement or vehicle and the obstacle. In another example, a field characteristic may include skipping of one or more swaths in a field zone, for instance to accommodate multiple vehicles conducting staggered operations. In this example, the virtual turn profile element 606 modifies the turn profile to elongate the turn profile along the forthcoming (headland) swath to arrive at the next proximate swath of the main field zone while skipping the intervening swath.

In another example, the virtual turn profile element 606 includes one or more of virtual turning radius elements configured to determine a virtual turning radius for the agricultural vehicle for modification of a turn profile. For instance, one or more characteristics of the agricultural vehicle (e.g., vehicle characteristics) or field characteristics (e.g., positioning of obstacles, spacing between swaths or the like) are used to modify one or more of the turn profiles provided herein, for instance, by providing a virtual turn radius for the agricultural vehicle corresponding, in one example, to the turn radius of the vehicle and then modified by one or more of the other agricultural vehicle characteristics or field characteristics. In some examples, the virtual turning radius is not equivalent to the turn radius of the vehicle. For instance, the turn radius may be greater because of a specified gravity rating or G-rating for a turn, the velocity or acceleration of the vehicle proximate to forthcoming turns or the spacing of one or more of the swaths. The virtual turning radius generated, for instance, with the virtual turn profile element 606 is used by the virtual turn profile element 606 (for instance, a turn modification element of the profile element 606) to modify the initial turn profile based on the virtual turn radius generated. The modulated turn profile modified with the turn modification element, for instance, based on the virtual turning radius is then used as the turn profile, for instance, for generation of a turn segment between swaths and conducting of a turn operation of the vehicle along the segment. In one example, the virtual turn radius provides one or more of a ceiling or floor to the radius (or radii) of a turn profile to ensure the agricultural vehicle will accomplish the turn (e.g., without tipping, collision or the like).

As further shown in FIG. 6A, the turn guidance system 306 further includes a profile direction element 608. The turn profile 420, 454 of FIGS. 4A, 4B (and FIG. 5) is moved toward an intersection of one or more swaths to accordingly generate swath departure and arrival locations and the intervening turn segment. The profile direction element 608 controls movement of the turn profile toward the intersection between two or more swaths. For instance, in one example, the profile direction element 608 moves the turn profile virtually toward a swath intersection such as the swath intersection 458 shown in FIG. 4B or the swath intersection 422 shown in FIG. 4A. In FIG. 4A, the turn profile 420 is virtually moved along the first swath 408 toward the swath intersection 422. Conversely, in FIG. 4B, the turn profile 454 is moved in a different manner, for instance, in a diagonal fashion that is not aligned with one or more of the swaths such as the first zone swath 408, second zone swath 412 or the like. Instead, as shown in FIG. 4B, the turn profile 454 is moved along a separate vector toward the swath intersection 458.

The turn guidance system 306 in FIG. 6A includes, in another example, an intersection element 610. The intersection element 610 monitors the directed turn profile (e.g., moved toward swath intersections) to detect intersections between the turn profile and the swaths. The intersection element 610 detects turn profile and swath intersections with one or more of mathematical, algorithm or graphical assessment of the turn profile and swaths proximate to the proposed turn. In an example, the intersection element 610 detects one or more of a tangent engagement between the turn profile and one or more swaths, crossing of the profile with the swaths or the like. The intersection element 610 indexes the locations of the detected intersections with the preceding and proceeding swaths (first and transverse second swath) as the swath departure location and the swath arrival location, respectively. The intersection between the turn profile and the first swath (the swath departure location) coincides to a start point of the turn segment while the intersection between the turn profile and the second proceeding swath (swath arrival location) corresponds to the turn segment end and the proceeding start of travel along the proceeding swath. The corresponding turn segment 604 is that portion of the turn profile extending between these locations. Optionally, the turn segment 604 includes the arcuate turn (shown in FIGS. 4A, 4B and 5) as well as the associated swath departure and swath arrival locations. In other words, the turn segment 604 in some examples includes the arcuate segment itself as well as the associated start and end locations of the segment. As discussed herein, the turn guidance system 306 having the turn plotting element 602 and associated example elements is configured to generate the turn segment 604. In one example, the turn guidance system 306 generates turn segments 604 in an ongoing manner, for example as the agricultural vehicle is operated within a field along swaths. The turn guidance system 306 accordingly generates turn segments 604 as the vehicle approaches potential turn locations. The turn profile is virtually moved toward a forthcoming swath intersection for the agricultural vehicle and the turn plotting element 602 generates the forthcoming turn segment.

In another example, the turn guidance system 306 pre-plans or generates turn segments 604. The turn profile is virtually moved through the field relative to the swaths before the vehicle is operating in the field or after the vehicle has begun operations but before the vehicle is approaching one or more potential turn locations. The turn profile is moved toward swath intersections (e.g., along swaths or along vectors different than the swaths). As previously discussed herein, the intersection of the turn profile with the swaths generates swath arrival and departure locations and the arcuate segment of the turn as the turn segment 604. The generation of turn segments 604 is repeated throughout the field to prepare turn segments for each turn location. As the vehicle arrives at the turn location (e.g., a swath departure location) the turn guidance system 306 assumes control of the vehicle and conducts the associated turn segment through completion to the associated swath arrival location at the proximate (next) swath.

After generation of the turn segment 604, shown in FIG. 6A, the turn segment is provided to a turn guidance control 600 configured to automatically drive the agricultural vehicle along the generated turn segment 604. For instance, in one example, the turn segment is used with the turn guidance control 600 to guide the agricultural vehicle along the specified turn segment and accordingly toward the proceeding or next swath. In another example, the turn guidance control 600 cooperates with or is a component of one or more other guidance systems, for instance, the vehicle comparator 320, in one example, associated with the swath guidance system 304. In this manner, the swath guidance system 304, may continue to operate to accordingly provide one or more of GPS, RTK guidance or one or more of the sensor-based guidances previously described herein even while the turn guidance system is the priority guidance system.

Figure 6B:
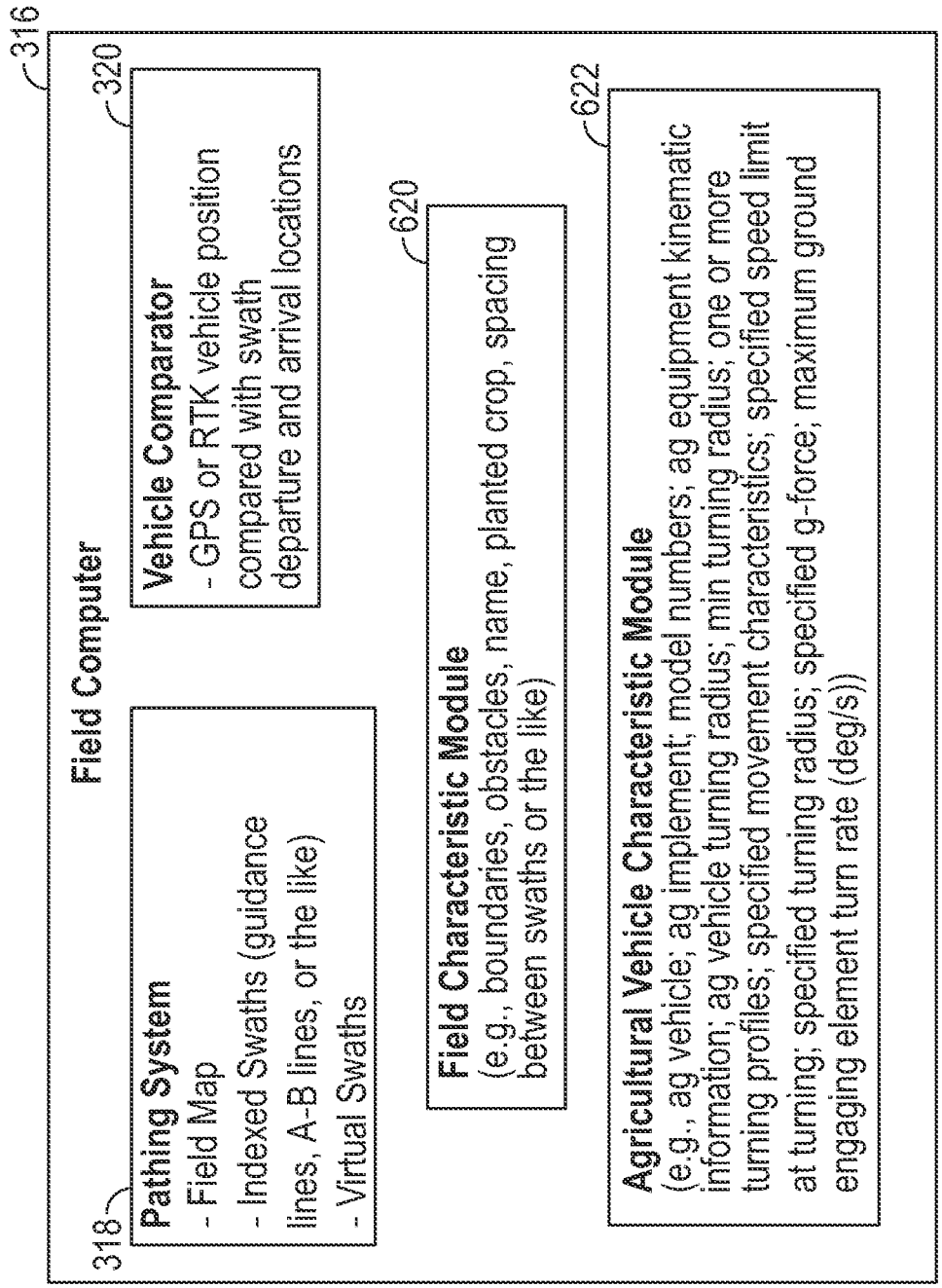
FIG. 6B is a schematic diagram of one example of a field computer.

FIG. 6B is a schematic view of another example of the field computer 316 including one or more of the components of the guidance assembly 300 previously shown and described in FIG. 3. In the example shown in FIG. 6B, the field computer 316 consolidates one or more of the components used for generation of the turn segments, guidance of the agricultural vehicle along one or more of the turn segments, along swaths or the like.

As shown in FIG. 6B, the field computer 316, in this example, includes the vehicle comparator 320. As previously described, the vehicle comparator monitors the vehicle location and facilitates the comparison of the vehicle location relative to one or more locations of interest along the swaths, along turn segments or the like including, but not limited to, determining the location of the vehicle relative to swath departure and arrival locations, for instance, for conducting turning operations of the vehicle within a field. In one example, the vehicle comparator 320 includes or is interconnected with one or more vehicle position systems including, for instance, a global positioning system (GPS), real-time kinematics (RTK) positioning system or the like to ascertain and monitor the position of the vehicle and progress along swaths, through turns or the like.

As further shown in FIG. 6B, the field computer 316 optionally includes a pathing system 318. As previously described, the pathing system 318 provides an array of swaths, for instance, one or more swaths in one or more field zones to facilitate driving of the vehicle along the swaths for agricultural operations and for generation of the turn segments as described herein. As described herein, the attribution of swaths to one or more field zones is a convention for explanation. The attribution of swaths to one or more zones is, in one example, not needed for operation of the autonomous guidance assembly 300 described herein.

In another example, the field computer 316 includes one or more of the characteristic modules used in the modification or modulation of one or more of the turn segments or turn profiles as described herein. As shown in FIG. 6B, the field computer 316 includes a field characteristic module 620. The field characteristic module 620 stores or retains input values for one or more characteristics associated with the field or agricultural operation conducted in the field including, but not limited to, boundary or obstacle locations including coordinates, dimensions or the like of the obstacles; a field name; the planted crop within the field; spacing between swaths (e.g., for staggered agricultural operations that skip one or more swaths during a turn); crop row spacing or the like. In another example, the field computer 316 includes the agricultural vehicle characteristics module 622 having one or more agricultural vehicle characteristics retained therein. The agricultural vehicle characteristic module 622 stores or receives input values for retention therein that are retained and used for operation of the agricultural vehicle with the composite guidance system 300. The agricultural vehicle characteristics including characteristics that enhance the generation and refinement of turn segments, as described herein, as well as facilitate driving of the vehicle along swaths and in turn segments. For example, the vehicle characteristics include, but are not limited to, vehicle type; implement type; model number; vehicle or implement kinematic information (dimensions, turning radius, weight, center or mass, moment of inertia or the like); one or more turning profiles, specified movement characteristics such as a maximum G-force for the vehicle; operator or technician specified G-force; specified speed limits proximate to and during a turn; maximum ground-engaging element turn rates (for instance, in units of degrees per meter per second) or the like. Optionally, one or more of the agricultural vehicle characteristics (whether for the vehicle or an associated implement) including a minimum turning radius, maximum G-force or the like, are analyzed to provide a virtual turning radius that is applied to the turn profile to provide one or more of a specified corresponding radius for the profile or one or more other dimensions or modulations to the profile to change the shape, profile or one or more other characteristics of the turn profile. In one example, the agricultural vehicle characteristics provided in the module 622 or field characteristics provided in the field characteristic module 620 modulate the turn profiles as described herein, for instance, to provide one or more of a ceiling or floor to the radius of the profile to thereby ensure turns are accomplished by the vehicle.

FIGS. 3, 6A and 6B are diagrammatic representations of a machine, such as the guidance assembly 300 or components of the assembly 300 (e.g., the composite guidance system 302, field computer 316 or the like) within which instructions (e.g., software, a program, an application, an applet, an app, or other executable code) for causing the machine to perform any one or more of the methodologies discussed herein may be executed (e.g., for one or more of swath guidance, turn guidance, composite guidance of both, agricultural vehicle operation, agricultural implement operation, automation of the same or the like). For example, the instructions may cause the machine (the guidance assembly 300, components thereof, the vehicle associated with the guidance assembly 300) to execute any one or more of the methods described herein, for instance automated driving and operation of an agricultural vehicle along swaths, through turns or the like. The instructions transform the general, non-programmed machine into a particular machine programmed to carry out the described and illustrated functions in the manner described. The machine, such as the guidance assembly 300 or components of the assembly 300 (e.g., the composite guidance system 302, field computer 316 or the like) may operate as a standalone device or may be coupled (e.g., networked) to other machines including the agricultural vehicle 140 (see FIG. 2B), such as to coordinate actions or actuation of steering, driving and operating agricultural implements based on control provided with the guidance assembly 300. In a networked deployment, the machine may operate in the capacity of a server machine or a client machine in a server-client network environment, or as a peer machine in a peer-to-peer (or distributed) network environment. The machine may comprise, but not be limited to, the agricultural vehicle, a portion of the agricultural vehicle, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions for guidance (e.g., composite guidance, swath guidance, turn guidance, agricultural vehicle operation, agricultural implement operation, automation of the same or the like), sequentially or otherwise, that specify actions to be taken by the machine. Further, the term "machine" shall also be taken to include a collection of machines that individually or jointly execute the instructions to perform any one or more of the guidance, automated driving, automated control or the like discussed herein.

The machine, such as the guidance assembly 300, field computer 316, composite guidance system 302 or the like, or the agricultural vehicle or components of the agricultural vehicle, may include processors, memory, and I/O components, which may be configured to communicate with each other via a bus or interface. In an example embodiment, the processors (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor that executes the instructions for composite guidance, swath guidance, turn guidance, agricultural vehicle operation, agricultural implement operation, automation of the same or the like. The term "processor" is intended to include multi-core processors that may comprise two or more independent processors (sometimes referred to as "cores") that may execute instructions contemporaneously. The machine may include a single processor with a single core, a single processor with multiple cores (e.g., a multi-core processor), multiple processors with a single core, multiple processors with multiples cores, or any combination thereof.

The memory in communication with the processor includes one or more of a main memory, a static memory, and a storage unit, accessible to the processor via the bus or interface. Optionally, the memory is a component of the guidance assembly 300, field computer 316, the composite guidance system 302, the agricultural vehicle or components of the agricultural vehicle. The main memory, the static memory, or storage unit store the instructions embodying any one or more of the methodologies or functions described herein, for instance composite guidance, swath guidance, turn guidance, agricultural vehicle operation, agricultural implement operation, automation of the same or the like. The instructions may also reside, completely or partially, within the main memory, within the static memory, within a machine-readable medium within the storage unit, within at least one of the processors (e.g., within the processor's cache memory), or any suitable combination thereof, during execution thereof by the machine, such as the guidance assembly 300 or components thereof.

The input/output (I/O) components, such as the input/output devices 314 may include a wide variety of components to receive input, provide output, produce output, transmit information, exchange information, capture measurements, and so on. The specific I/O components that are included in a particular machine will depend on the type of machine, for instance a guidance assembly 300 as an integrated component of an agricultural vehicle or a guidance assembly 300 as a portable machine system (e.g., as part of the field computer 316) in communication with an agricultural vehicle. For example, portable machines such as mobile phones may include a touch input device or other such input mechanisms, while a headless server machine will likely not include such a touch input device. It will be appreciated that the I/O components may include many other components. In various example embodiments, the I/O components may include output components and input components including, but not limited to, visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components may include sensors, such as the swath sensors 322 shown in FIG. 3 (and shown and discussed in FIGS. 8-10B). The swath sensors 322 include, but are not limited to, radar, LIDAR, ultrasound, optical (camera or video) sensors and associated signal/image processing controllers, algorithms or the like. For instance, the I/O components as example swath sensors 322 include components that may provide indications, measurements, or signals corresponding to a surrounding physical environment, for instance distance relative to crops, swath edges, position relative to crops or swaths or the like. Other I/O components include the vehicle comparator 320 (see FIGS. 3, 6A, 6B) and associated or integral position determining features, such as a global positioning system (GPS) receiver, real time kinematics (RTK) system, orientation sensor components (e.g., magnetometers) or the like.

Communication may be implemented using a variety of technologies. The I/O components further include communication components operable to couple the machine to a network or devices via a wired coupling, wireless coupling or the like. For example, the communication components may include a network interface component or another suitable device to interface with a network. In further examples, the communication components may include wired communication components, wireless communication components, cellular communication components, Near Field Communication (NFC) components, Bluetooth® components (e.g., Bluetooth® Low Energy), Wi-Fi® components, and other communication components to provide communication via other modalities. The machine (e.g., the guidance assembly 300, composite guidance system 302, field computer 316 or the like, or agricultural vehicle or components of the vehicle associated thereof) communicates with other devices, for instance another machine (e.g., other agricultural vehicles, a server, cloud based system or the like) or any of a wide variety of peripheral devices (e.g., a peripheral device coupled via a USB wired connection).

Moreover, the communication components may detect identifiers or include components operable to detect identifiers. For example, the communication components may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes and other optical codes), or acoustic detection components (e.g., microphones to identify tagged audio signals). In addition, a variety of information may be derived via the communication components, such as location via Internet Protocol (IP) geolocation, location via Wi-Fi® signal triangulation, location via detecting an NFC beacon signal that may indicate a particular location, and so forth.

The various memories (e.g., memory, main memory, static memory, and/or memory of the processors) or storage unit may store one or more sets of instructions and data structures (e.g., software) embodying or used by any one or more of the methodologies or functions described herein for control, guidance, operation, automated driving or the like of an agricultural vehicle, or implement. These instructions when executed by processors, cause various operations to implement the disclosed embodiments.

The instructions may be transmitted or received over a network, using a transmission medium, via a network interface device (e.g., a network interface component included in the communication components) and using any one of a number of well-known transfer protocols (e.g., hypertext transfer protocol (HTTP)). Similarly, the instructions may be transmitted or received using a transmission medium via a coupling (e.g., a peer-to-peer coupling) between the machine and other devices (e.g., other machines, vehicles, servers, cloud system or the like).

Figure 7:
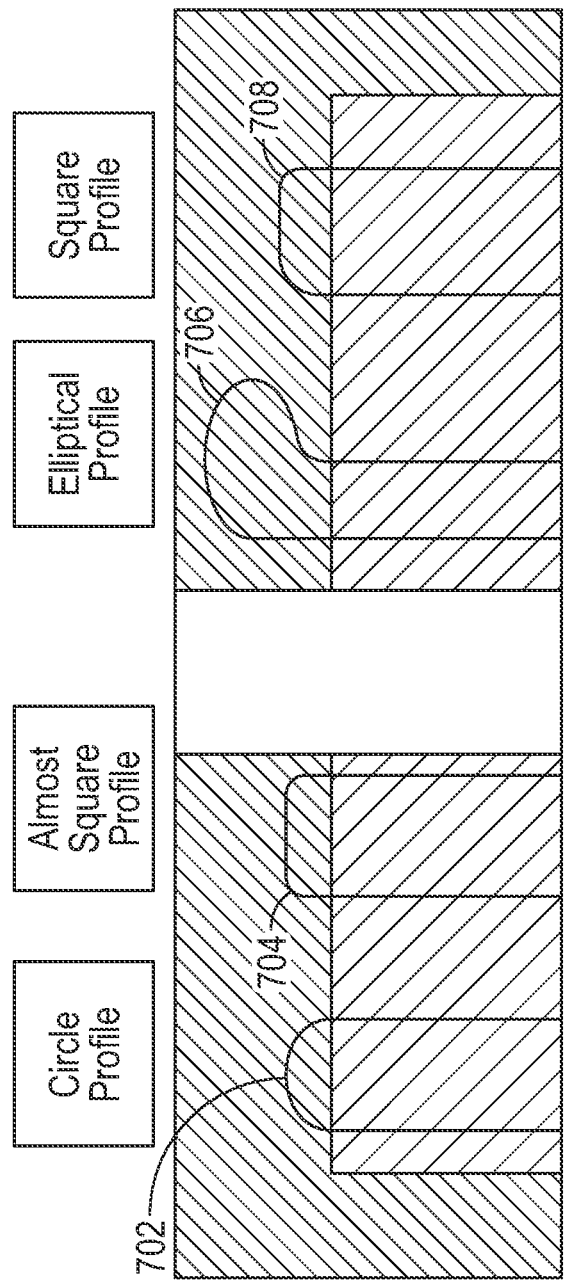
FIG. 7 is a collection of example turn profiles for use with the autonomous guidance assembly.

FIG. 7 shows a variety of schematic examples of turn profiles for the turn guidance system 306. Optionally, the turn profiles are retained in the virtual turn profile element 606 shown in FIG. 6A. FIG. 7 shows a number of examples but is not exhaustive. In other examples, one or more of the turn profiles such as the turn profiles 702-708 are combined or modified to accordingly provide one or more varied turn profiles for use with the turn guidance system 306. Referring now to FIG. 7, one example of a turn profile included with the turn guidance system 306 or input to the turn guidance system 306 includes a circle turn profile 702. In one example, modulation of the circle turn profile 702 includes variations in radius and modification of the shape into one or more elliptical shapes, for instance, to provide a flat ovular profile to facilitate the turning of the agricultural vehicle between one or more swaths, for instance, with an intervening swath there between.

FIG. 7 shows another example of an almost square turn profile 704 including a minimum turn radius for one or more of the corners of the turn profile. In an example, the almost square turn profile includes a zone between the corner portions, for instance, corresponding to a swath segment used in one or more of the composite turn such as the composite turn 200A shown in detail in FIG. 2B or one or more of the composite turns 200A-F shown in FIG. 2A. Optionally, the minimum turn radius segments provided at the corners of the profile are, in one example configured for modification, for instance, with the virtual turn profile element 606 according to one or more of field characteristics, agricultural vehicle characteristics or the like.

FIG. 7 further shows another example turn profile including the elliptical turn profile 706. The elliptical turn profile 706 optionally includes one or more component turn profiles that are combined together to form the example elliptical turn profile. Optionally, the component turn profiles each include respective radii, eccentricity or the like that are optionally modulated collectively or independently as part of a generation of turn segments comprising the elliptical profile 706. In various examples, the elliptical turn profile 706 is modified with one or more of the agricultural vehicle characteristics, field characteristics or the like previously described herein. In still other examples, the elliptical turn profile 706 includes a lightbulb or Dubins path turn profile. For instance, a light bulb turn profile includes, in the context of FIG. 7, an initial left turn (away from the second proximate, next swath) as a vehicle comes out of a first swath and initiates the turn, followed by a gradual right turn as the vehicle approaches the second proximate (next) swath, and completed with another left turn toward the second proximate, next swath. A lightbulb or Dubins path turn profile is optionally used with larger agricultural vehicles, vehicles having hitched implements or the like that warrant a larger turn profile to ensure the vehicle and implements are aligned with the second proximate (next) swath at the completion of the turn.

FIG. 7 further includes another example turn including the square turn profile 708. The square turn profile 708 includes an adjustable radius at one or more of the corners that is varied based on the velocity of the vehicle (an example of an agricultural vehicle characteristic) within a present swath or a specified speed of operation of a forthcoming swath, for instance, a proximate or next swath. For instance, in one example, the radius at the corner of one or more corners of the square profile is, in one example, modulated in an ongoing fashion with operation of the agricultural vehicle, for instance, based on its velocity as it approaches the respective turn including the square turn profile 708 that generates the turn segment. In the example shown in FIG. 7, the left corner has a larger radius than the right corner, for instance because the velocity of the vehicle heading into the turn proximate to the left corner is relatively high and modifies that corner of the profile while the velocity of the vehicle in the straight segment of the profile is lower and the right corner has a smaller radius. Accordingly, the square turn profile 708, in various examples, may have one or more 'wide' corners with an approach speed or velocity of the agricultural vehicle that is relatively high while the corner proximate to the exit of the turn is 'tight' because a lower vehicle velocity within the turn segment.

As previously shown and described in FIG. 7, the example turn profiles of the example guidance assembly 300 described herein include one or more turn profiles configured to generate turn segments for conducting automated turns of the agricultural vehicle. Optionally, the turn profiles include one or more geometric shapes, contours or the like (e.g., herein turn profiles) formed with continuous lines, line segments, points or the like. Various profiles are varied as described herein (including modulation, modification or the like) based on one or more field or vehicle characteristics such as specified speed or velocity for turning; implement or vehicle kinematics such as vehicle dimensions, wheel base, turning radius, implementer hitch dimensions or the like. Other example turn profiles include, but are not limited to, clothoid splines, light bulb (e.g., Dubins path) profiles or the like. As previously described, one or more of the turn profiles previously described and discussed herein are, in various examples, modified or combined with other profiles to generate distinct profiles that are applied in a similar manner between two or more swaths to generate turn segments there between.

In applying the example turn profiles 702-708 (and variations of the same, such as a lightbulb) with the guidance assembly 300, the composite guidance assembly 302 or the like, the virtual turn profile element 606 (see FIG. 6A) modulates the turn profiles based on one or more of agricultural vehicle characteristics, field characteristics or the like. The profile direction element 608 moves the example turn profiles 702-708 toward swath intersections and marries the profiles to the component swaths, as described herein. In an example, including a reversing turn profile, such as the elliptical 706 (or lightbulb), almost square 704 profile or the like the turn profile is optionally broken into component turn profiles (in the manner of FIG. 2B) that are married to the respective preceding and forthcoming swaths, and the composite guidance system 302 switches to the swath guidance system 304 for the intervening portion of a composite turn.

Figure 8:
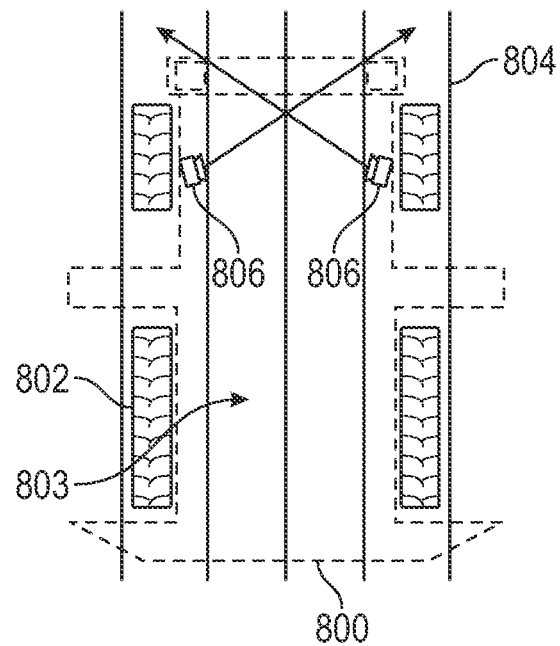
FIG. 8 is a schematic diagram of an agricultural vehicle including swath sensors.
Figure 9A:
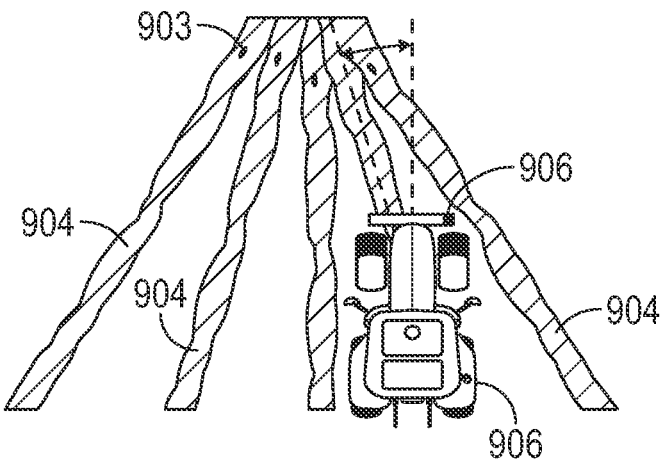
FIG. 9A is a perspective schematic diagram of an agricultural vehicle including another example of swath sensors.
Figure 9B:
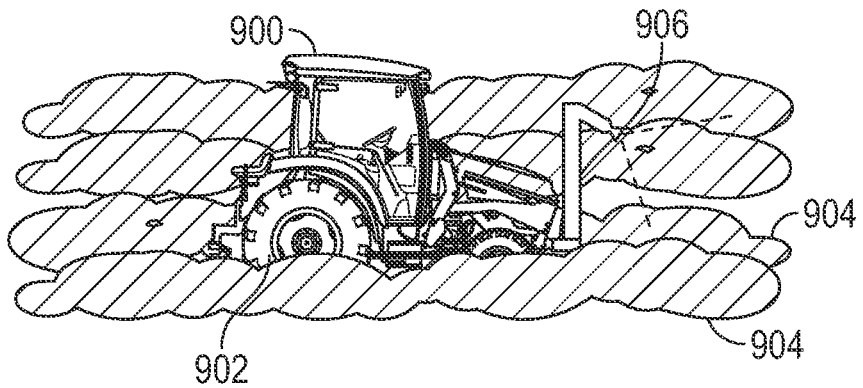
FIG. 9B is a side schematic diagram of the agricultural vehicle of FIG. 9A including the example swath sensors.

FIGS. 8, 9A, 9B illustrate examples of vehicles having swath sensors configured for guiding the associated agricultural vehicle 800, 900 while driving along a swath. These swath sensor examples are optionally in communication with the swath guidance system 304 shown in FIG. 3 and described herein. The swath sensors 806 detect one or more features of the swath 803 such as the position of one or more crop rows 804 relative to the sensors 806. The swath guidance system 304 receives the measurements and conducts driving of the agricultural vehicle 800, 900 based on the measurements, for instance to maintain ground engaging elements between crop rows 804.

FIG. 8 shows a first agricultural vehicle 800 schematically in a swath 803. The swath 803 in this example includes a plurality of crop rows 804. The agricultural vehicle includes one or more swath sensors 806. For instance, the swath sensors are positioned proximate to ground engaging elements 802 of the vehicle 800, in this example the forward mounted elements 802. As shown with arrows in FIG. 8, the swath sensors 806 are directed transversely relative to the swath 803 and the crop rows 804. For example, the swath sensors 806 are directed diagonally as well as forward facing. The scan lines (shown with arrows) pass through one or more of the crop rows 804 to facilitate detection of the crop rows 804. The position of the swath sensors 806 relative to the ground engaging elements 802 is known. Accordingly, by detecting the position of the crop rows 804 the relative position of the ground engaging elements 802 is known. In one example, the distance between crop rows 804 is known (e.g., input by the operator, stored from an earlier planting operation or the like). The swath sensors 806 determine the position of one or more crop rows 804 and the position of the ground engaging elements 802 within the crop rows 804 is readily determined. In another example, the swath sensors 806 are directed toward swath edges 111 (e.g., in FIGS. 2A, B) to detect the boundary of the swath. With crops that are planted without crop rows, such as wheat, barley or the like, steering of the agricultural vehicle 800 along the swath edge 111 is conducted to guide the agricultural vehicle along the swath.

The swath sensors 806 shown in FIG. 8 include one or more types of sensors configured to detect crops, tramlines, or the like. For example, the swath sensors 806 include, but are not limited to, one or more of radar, LIDAR, ultrasound sensors or the like. Optionally, one or more of global positioning (GPS), real time kinematics (RTK) or the like are used with the swath guidance system 304 for monitoring and guidance of the vehicle 800 along the swath 803, and optionally through one or more turn segments, for instance through comparison of the monitored vehicle position relative to the swath 803 (e.g., having an associated guidance line) or the turn segments.

Referring now to FIGS. 9A, B another example of swath sensors 906 include vision sensors such as, but not limited to cameras, video cameras, photo eyes or the like. The swath sensors 906 provide one or more of still or video images of a swath 903, and optionally crop rows 904. The still or video images are analyzed to identify crop rows, swath edges or the like. The swath guidance system 304 provides guidance instructions for the agricultural vehicle that steer the vehicle along the swath based on the identified crop rows or swath edges.

As shown in FIG. 9B, the swath sensor 906 is, in one example, elevated relative to the crop rows 904. The elevation of the swath sensor 906 facilitates viewing of multiple crop rows 904. Additionally, the elevation increases the field of view of the swath sensor 906, and in another example, facilitates identification of a swath edge potentially along the periphery of the field of view.

The position of the swath sensor 906 and the relative position of the ground engaging elements 902 is known.

Identification of the crop rows 904, swath edges or the like and the associated distances of these features from the swath sensor 906 correspondingly determines the position of the detected features relative to the ground engaging elements. Accordingly, the swath guidance system 304 directs the agricultural vehicle 900 to maintain the ground engaging elements 902 between crop rows 904.

Figure 10A:
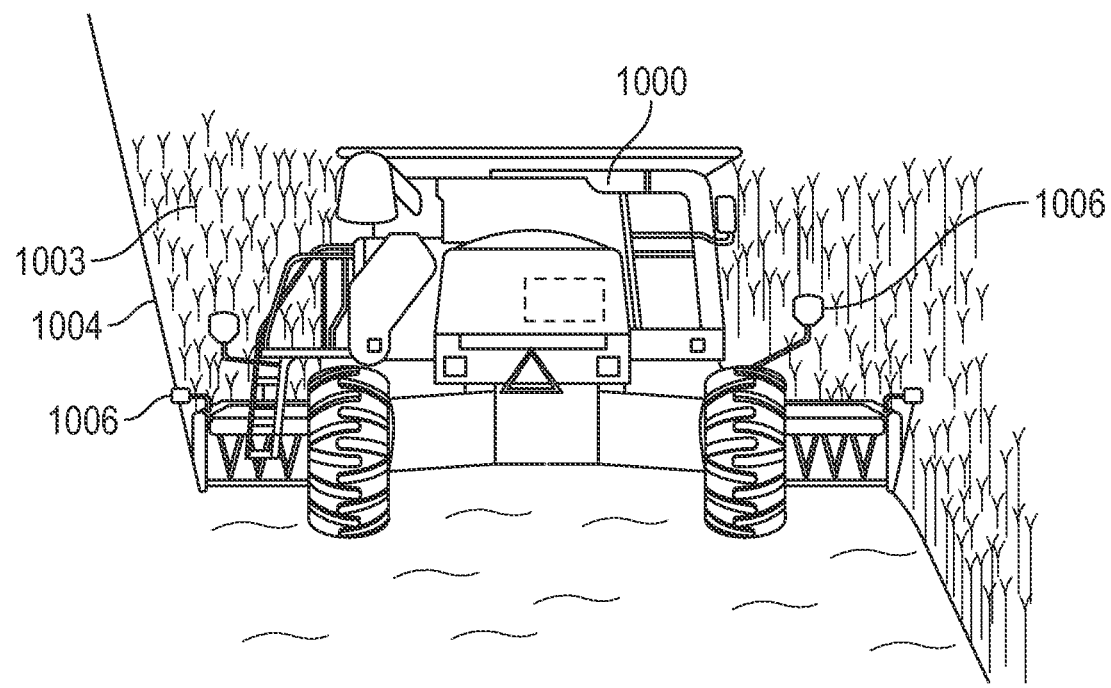
FIG. 10A is a perspective schematic diagram of an agricultural vehicle including an additional example of swath sensors.

An example of swath sensors configured to detect features of a swath 1003, such as swath edges 1004, is shown in FIGS. 10A, B. An example agricultural vehicle 1000 (e.g., a harvester, mower or the like) includes one or more swath sensors 1006 provided on the vehicle (including an associated implement). The swath guidance system 304 is in communication with the sensors 1006 to facilitate swath guidance of the vehicle along the swath 1003. In the example shown in FIG. 10A, the swath sensors 1006 are directed forward of the vehicle and the swath guidance system 304 accordingly guides the vehicle 3000 in a manner that maintains the agricultural implement (e.g., a harvester head) aligned with the swath edge 1004 to ensure the agricultural implement extends from edge 1004 inwardly without missing crops.

Figure 10B:
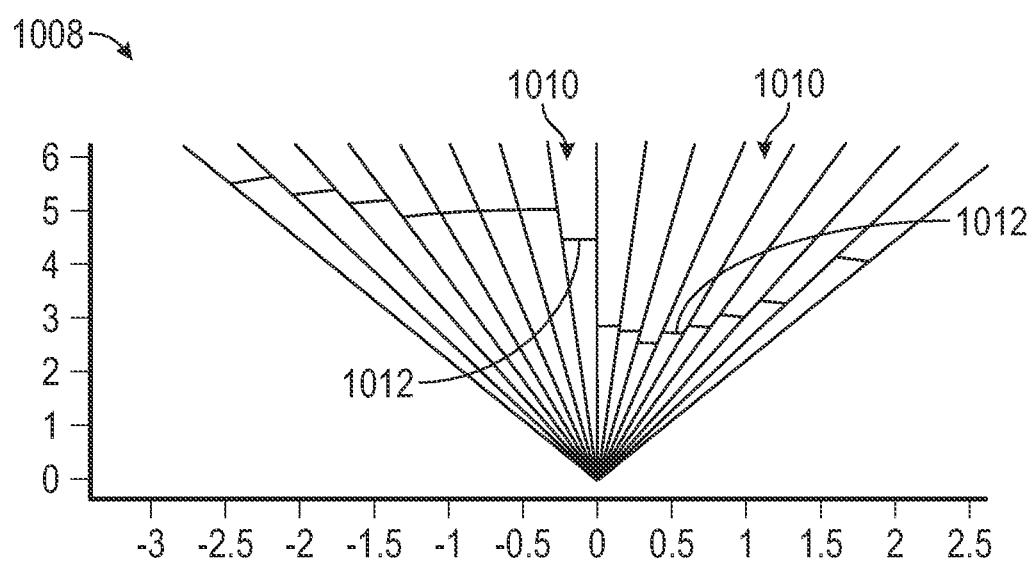
FIG. 10B is a plot of measurements taken along scan lines of the example swath sensors of FIG. 10A.

The swath sensors 1006 include, but are not limited to, one or more laser or light generating sensors configured to generate scan lines of electromagnetic energy. The sensors 1006 analyze reflected electromagnetic energy to assess distances (and the presence of features, such as crops) and thereby identify the swath edge 1004. An example scan line plot 1008 corresponding to distance measurements of the swath 1003 is shown in FIG. 10B. As provided in the plot 1008 measurements along the scan lines 1010 corresponding to distances from the swath sensor 1006 to an object within the scan lines of the vehicle 1000. As shown in this example, the scan lines to the left of the plot indicate a larger distance corresponding a previous harvested portion of the field. Conversely, the scan lines in the right portion of the plot correspond to the oncoming crop in the swath 1003, and accordingly show smaller distance measurements between the sensor 1006 and the more proximate crops.

The example sensors shown and discussed herein for guidance along a swath with the swath guidance system 304. The example sensors are configured to detect one or more features of the swath including, but not limited to, crop rows, swath edges, tram lines, ridges or mounds for crop planting, obstacle perimeters, boundaries, fence lines, water ways, river and creek beds, ditches or culverts, or actual coverage of an agricultural implement of the agricultural vehicle along one or more of the preceding features.

In other examples, the swath guidance system 304 communicates with one or more positioning systems (another example of swath sensors) for guidance of the agricultural vehicle along swaths. Optionally, the positioning system is a component of or used in communication with the guidance assemblies discussed herein, for instance the vehicle comparator 320 (FIG. 3). Positioning systems include, but are not limited to, global positioning system (GPS), real time kinematics (RTK) or the like, configured to monitor the position of the vehicle relative to one or more features associated with swaths, a field or the like. The monitored vehicle location is received by the swath guidance system 304 and compared with one or more swaths, including features of the swaths, turns or the like. Features of swaths and turns include, but are not limited to, guidance lines; coverage guidance lines; virtual swath lines provided on a virtual field map; A-B lines; planned paths for the agricultural vehicle; Last Pass lines or swaths (e.g., a trademark of Raven Industries Inc.); offset straight lines between two end points, lines or zones; guidance lines that pivot, circumscribe or extend around a point, obstacle or the like; actual swath lines; previous vehicle passage swath lines; actual or virtual coverage of an agricultural implement of the agricultural vehicle along one or more of the preceding features); or the turn segments or turn profiles as described herein to monitor initiation of a turn, progress through the turn, and completion of the turn. The comparison, and determination of a difference (e.g., an error or displacement) relative to the swath or turn segment is an input to the swath guidance system 304 or turn guidance system 306. The guidance systems 304, 306 generate corrections (e.g., guidance instructions) that are supplied through the automated driving interface 310 and implemented through automated driving to minimize the determined differences, for instance in the manner of feedback control.

Optionally, input from the positioning systems are used in combination with measurements from other swath sensors 806, 906, 1006 to enhance guidance of the agricultural vehicle. For example, the positioning systems and the vehicle comparator provide gross control of the agricultural vehicle along swaths, turn segments or the like while swath sensors 806, 90, 1006 provide localized measurements for use with the swath guidance system 304 for precise positioning of the ground engaging elements (e.g., wheels, tracks, runners or the like) between swaths to minimize overrunning and damage to crops.

Various Notes and Aspects

Aspect 1 can include subject matter such as a method for autonomously driving agricultural vehicle comprising: guiding the agricultural vehicle along a first zone swath with a swath guidance system; automatically toggling the swath guidance system and a turn guidance system proximate a second zone swath transverse to the first zone swath, toggling includes: activating the turn guidance system; and pausing the swath guidance system; guiding the agricultural vehicle along a turn segment from the first zone swath to the transverse second zone swath with the turn guidance system; automatically toggling the swath guidance system and the turn guidance system proximate to the transverse second zone swath, toggling includes: activating the swath guidance system; and pausing the turn guidance system; and guiding the agricultural vehicle along the transverse second zone swath with the swath guidance system.

Aspect 2 can include, or can optionally be combined with the subject matter of Aspect 1, to optionally include wherein guiding the agricultural vehicle along at least one of the first zone swath or the transverse second zone swath includes guiding the agricultural vehicle along a respective first guidance line of the first zone swath and a second guidance line of the transverse second zone swath with the swath guidance system.

Aspect 3 can include, or can optionally be combined with the subject matter of one or any combination of Aspects 1 or 2 to optionally include wherein automatically toggling the swath guidance system and the turn guidance system proximate the transverse second zone swath includes: comparing an agricultural vehicle position with a first swath departure location of the first zone swath or a second swath arrival location to determine arrival of the agricultural vehicle, respectively, at the first swath departure location or the second swath arrival location; and initiating automatic toggling based on the determined arrival of the agricultural vehicle.

Aspect 4 can include, or can optionally be combined with the subject matter of one or any combination of Aspects 1-3 to optionally include E wherein a first swath departure location is a start location of the turn segment and the second swath arrival location is a finish location of the turn segment.

Aspect 5 can include, or can optionally be combined with the subject matter of one or any combination of Aspects 1-4 to optionally include wherein each of the agricultural vehicle position, the first swath departure location and the second swath arrival location include associated vectors indicative of respective position and orientation; and comparing the agricultural vehicle position with the first swath departure location or the second swath arrival location to determine arrival includes comparing the associated vectors.

Aspect 6 can include, or can optionally be combined with the subject matter of Aspects 1-5 to optionally include wherein automatically toggling the swath guidance system and the turn guidance system proximate the transverse second zone swath includes: sensing the transverse second zone swath; comparing an agricultural vehicle position relative to the sensed transverse second zone swath; and initiating automatic toggling based on the arrival of the agricultural vehicle at a first swath departure location associated with the sensed transverse second zone swath.

Aspect 7 can include, or can optionally be combined with the subject matter of Aspects 1-6 to optionally include wherein sensing the transverse second zone swath includes one or more of detecting a swath edge, one or more crop rows, a second guidance line or an obstacle respectively associated with the transverse second zone swath.

Aspect 8 can include, or can optionally be combined with the subject matter of Aspects 1-7 to optionally include wherein automatically toggling the swath guidance system and the turn guidance system proximate the transverse second zone swath includes: sensing an end of the first zone swath; comparing an agricultural vehicle position relative to the end of the first zone swath; and initiating automatic toggling based on the arrival of the agricultural vehicle at a first swath departure location associated with the sensed end of the first zone swath.

Aspect 9 can include, or can optionally be combined with the subject matter of Aspects 1-8 to optionally include wherein automatically toggling includes one or more of: prioritizing the swath guidance system over the turn guidance system; or prioritizing the turn guidance system over the swath guidance system.

Aspect 10 can include, or can optionally be combined with the subject matter of Aspects 1-9 to optionally include wherein guiding the agricultural vehicle along the first zone swath with the swath guidance system includes guiding the agricultural vehicle with a row guidance system configured to guide the agricultural vehicle between crop rows.

Aspect 11 can include, or can optionally be combined with the subject matter of Aspects 1-10 to optionally include wherein guiding the agricultural vehicle along the turn segment with the turn guidance system includes guiding the agricultural vehicle with one or more of a global positioning system (GPS) guidance system or real time kinematic (RTK) guidance system.

Aspect 12 can include, or can optionally be combined with the subject matter of Aspects 1-11 to optionally include guiding the agricultural vehicle from the first zone swath to a proximate first zone swath with a composite turn through the transverse second zone swath, guiding through the composite turn including guiding with the turn guidance system and the swath guidance system.

Aspect 13 can include, or can optionally be combined with the subject matter of Aspects 1-12 to optionally include wherein the composite turn includes first and second turn segments and an intervening swath segment, and the turn segment includes the first turn segment; and guiding the agricultural vehicle with the composite turn includes: guiding the agricultural vehicle along the first turn segment from the first zone swath to the transverse second zone swath with the turn guidance system; guiding the agricultural vehicle along the intervening swath segment of the transverse second zone swath with the swath guidance system; automatically toggling the swath guidance system and the turn guidance system proximate the proximate first zone swath; guiding the agricultural vehicle along the second turn segment from the transverse second zone swath to the proximate first zone swath with the turn guidance system; automatically toggling the turn guidance system and the swath guidance system proximate to the proximate first zone swath; and guiding the agricultural vehicle along the proximate first zone swath with the swath guidance system.

Aspect 14 can include, or can optionally be combined with the subject matter of Aspects 1-13 to optionally include generating the turn segment including: plotting the turn segment based on a turn profile and a first swath departure location and a second swath arrival location.

Aspect 15 can include, or can optionally be combined with the subject matter of Aspects 1-14 to optionally include wherein generating the turn segment includes at least one of: generating the turn segment according to first and second guidance lines associated with the first and second zone swaths; or generating the turn segment according to sensing of one or more of the first or second zone swaths including guidance lines, swath edges, obstacles, obstacle perimeters, headlands, crop rows or crop edges associated with the first or second zone swaths in an ongoing manner from the agricultural vehicle approaching the second zone swath.

Aspect 16 can include, or can optionally be combined with the subject matter of Aspects 1-15 to optionally include wherein generating the turn segment includes determining the first swath departure location and the second swath arrival location including: moving a virtual turn profile corresponding to the turn profile toward an intersection of the first and second zone swaths; indexing a first intersection of the virtual turn profile with the first zone swath as the first swath departure location; indexing a second intersection of the turn profile with the second zone swath as the second swath arrival location; and wherein the turn segment includes the portion of the virtual turn profile extending between the first swath departure location and the second swath arrival location.

Aspect 17 can include, or can optionally be combined with the subject matter of Aspects 1-16 to optionally include wherein the turn profile includes a modulated turn profile based on an initial turn profile, and generating the turn segment includes: determining a virtual turning radius for the agricultural vehicle according to one or more vehicle characteristics associated with the agricultural vehicle and one or more field characteristics associated with an agricultural field including the first and second zone swaths; and modulating the initial turn profile based on the virtual turning radius to determine the modulated turn profile.

Aspect 18 can include, or can optionally be combined with the subject matter of Aspects 1-17 to optionally include wherein moving the virtual turn profile includes moving the virtual turn profile along a first guidance line of the first zone swath toward a second guidance line of the second zone swath.

Aspect 19 can include, or can optionally be combined with the subject matter of Aspects 1-18 to optionally include wherein moving the virtual turn profile includes moving the virtual turn profile toward an intersection of a first guidance line of the first zone swath and a second guidance line of the second zone swath.

Aspect 20 can include, or can optionally be combined with the subject matter of Aspects 1-19 to optionally include wherein indexing the first and second intersections includes indexing tangent intersections between the virtual turn profile and the first and second zone swaths, respectively.

Aspect 21 can include, or can optionally be combined with the subject matter of Aspects 1-20 to optionally include wherein indexing the first and second intersections includes indexing crossing intersections between the virtual turn profile and the first and second zone swaths, respectively.

Aspect 22 can include, or can optionally be combined with the subject matter of Aspects 1-21 to optionally include wherein guiding the agricultural vehicle along the first zone swath and the transverse second zone swath includes maintaining ground engaging elements of the agricultural vehicle between crop rows of the respective first and transverse second zone swaths.

Aspect 23 can include, or can optionally be combined with the subject matter of Aspects 1-22 to optionally include a guidance assembly for autonomously driving an agricultural vehicle comprising: an automated driving interface configured to control one or more driving functions of the agricultural vehicle; a pathing system configured to provide an array of swaths indexed to a field, wherein the array of swaths includes at least a first zone swath in a first field zone and a second zone swath in a second field zone, the second zone swath is transverse to the first swath; and a composite guidance system in communication with the automated driving interface and the pathing system, the composite guidance system includes: a turn guidance system configured to guide the driven agricultural vehicle along at least one turn segment extending between the first zone swath and the transverse second zone swath; a swath guidance system configured to guide the driven agricultural vehicle along the first zone swath and the transverse second zone swath; a comparator configured to compare an agricultural vehicle position of the agricultural vehicle with swath departure and arrival locations; and an interswath turning element configured to automatically toggle the turn and swath guidance systems between activated and paused configurations according to the compared agricultural vehicle position and the swath departure and arrival locations.

Aspect 24 can include, or can optionally be combined with the subject matter of Aspects 1-23 to optionally include wherein the automated driving interface is configured to control driving functions including each of steering, acceleration, and braking.

Aspect 25 can include, or can optionally be combined with the subject matter of Aspects 1-24 to optionally include wherein the array of swaths include one or more of guidance lines, virtual swath lines, A-B lines, planned paths for the agricultural vehicle, actual swath lines, swath edges, crop rows, crop edges, ridges or mounds for crop planting, tram lines, previous vehicle passage swath lines, obstacle perimeters, boundaries, fence lines, old fence lines, water ways, river and creek beds, actual or virtual coverage of an agricultural implement of the agricultural vehicle along one or more of the preceding features.

Aspect 26 can include, or can optionally be combined with the subject matter of Aspects 1-25 to optionally include wherein one or more of the pathing system or the composite guidance system is an element of a field computer.

Aspect 27 can include, or can optionally be combined with the subject matter of Aspects 1-26 to optionally include wherein the swath guidance system includes a row guidance system configured to maintain ground engaging elements of the agricultural vehicle between crop rows associated with the respective first zone swath or transverse second zone swath.

Aspect 28 can include, or can optionally be combined with the subject matter of Aspects 1-27 to optionally include wherein the turn guidance system includes one or more of a GPS guidance system or a real time kinematics (RTK) guidance system.

Aspect 29 can include, or can optionally be combined with the subject matter of Aspects 1-28 to optionally include one or more swath sensors configured for coupling with the agricultural vehicle, and the one or more swath sensors are in communication with the swath guidance system; and the one or more swath sensors are configured to detect one or more of crop rows, crop row edges, swath edges, unharvested crop edges, or obstacles.

Aspect 30 can include, or can optionally be combined with the subject matter of Aspects 1-29 to optionally include wherein the array of swaths include: a plurality of first zone swaths, including the first zone swath, indexed to an interior portion of the field as the first field zone; and at least one second zone swath, including the transverse second zone swath, indexed to a perimeter portion of the field as the second field zone.

Aspect 31 can include, or can optionally be combined with the subject matter of Aspects 1-30 to optionally include wherein the array of swaths include: a plurality of first zone swaths, including the first zone swath, indexed to a first portion of the field as the first field zone; and a plurality of second swaths, including the transverse second zone swath, indexed to one or more obstacle perimeters of the field as the second field zone.

Aspect 32 can include, or can optionally be combined with the subject matter of Aspects 1-31 to optionally include wherein the array of swaths include: a plurality of first zone swaths, including the first zone swath, indexed to a first portion of the field as the first field zone; and a plurality of second swaths, including the transverse second zone swath, indexed to a second zone of the field as the second field zone.

Aspect 33 can include, or can optionally be combined with the subject matter of Aspects 1-32 to optionally include wherein the turn guidance system includes a turn profile element having one or more turn profiles.

Aspect 34 can include, or can optionally be combined with the subject matter of Aspects 1-33 to optionally include wherein the swath departure location and swath arrival location include at least a first swath departure location and a second swath arrival location, respectively, the turn guidance system includes: a turn plotting element configured to plot the turn segment based on a turn profile and a first swath departure location and a second swath arrival location.

Aspect 35 can include, or can optionally be combined with the subject matter of Aspects 1-34 to optionally include wherein the turn plotting element includes: a turn profile direction element configured to virtually move the turn profile toward an intersection of the first zone swath and the second zone swath; an intersection element configured to index a first intersection of the turn profile with the first zone swath as the first swath departure location, and index a second intersection of the turn profile with the second zone swath as the second swath arrival location; and wherein the turn segment includes the portion of the turn profile extending between the first swath departure location and the second swath arrival location.

Aspect 36 can include, or can optionally be combined with the subject matter of Aspects 1-35 to optionally include wherein the turn profile includes a modulated turn profile based on an initial turn profile, and the turn plotting element includes: a virtual turning radius element configured to determine a virtual turning radius for the agricultural vehicle according to one more agricultural vehicle characteristics associated with the agricultural vehicle and one or more field characteristics associated with the field; and a turn modification element configured to modulate the initial turn profile based on the virtual turn radius to determine the modulated turn profile.

Aspect 37 can include, or can optionally be combined with the subject matter of Aspects 1-36 to optionally include wherein the turn guidance system includes a database of one or more turn profiles including: a circular profile; an almost square profile; a square profile; an elliptical profile; a Dubins path; a clothoid spline profile; a composite turn profile including one or more turn profiles; and radius, dimensions, shape and sectioned variations of the one or more turn profiles.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable or machine-readable media include, but are not limited to, elements such as hard disks, removable magnetic disks, removable optical disks (e.g., compact disks and digital video disks), magnetic cassettes, memory cards or sticks, random access memories (RAMs), read only memories (ROMs), circuits, modules or the like. Herein these media and their associated instructions are referred to interchangeably as elements or modules.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for autonomously driving agricultural vehicle comprising:
   guiding the agricultural vehicle along a first zone swath with a swath guidance system;
   automatically toggling between the swath guidance system and an independent turn guidance system proximate a transverse second zone swath, the transverse second zone swath is transverse to the first zone swath, toggling includes:
   activating the turn guidance system; and
   pausing the swath guidance system;
   guiding the agricultural vehicle along a turn segment from the first zone swath to the transverse second zone swath with the turn guidance system, guiding the agricultural vehicle includes:

moving a turn profile of the agricultural vehicle along the first zone swath toward an intersection of the first zone swath and the transverse second zone swath; and detecting an intersection of the first zone swath with the second zone swath and the turn profile;

wherein the turn profile includes a curved contour and the turn profile is based on characteristics of the agricultural vehicle, and the turn segment includes at least a portion of the curved contour;

automatically toggling between the swath guidance system and the independent turn guidance system proximate to the transverse second zone swath, toggling includes:

activating the swath guidance system; and
pausing the turn guidance system; and guiding the agricultural vehicle along the transverse second zone swath with the swath guidance system.

2. The method of claim 1, wherein guiding the agricultural vehicle along at least one of the first zone swath or the transverse second zone swath includes guiding the agricultural vehicle along a respective first guidance line of the first zone swath and a second guidance line of the transverse second zone swath with the swath guidance system.

3. The method of claim 1, wherein automatically toggling the swath guidance system and the turn guidance system proximate the transverse second zone swath includes:

comparing an agricultural vehicle position with a first swath departure location of the first zone swath or a second swath arrival location of the transverse second zone swath to determine arrival of the agricultural vehicle, respectively, at the first swath departure location or the second swath arrival location; and initiating automatic toggling based on the determined arrival of the agricultural vehicle.

4. The method of claim 3, wherein a first swath departure location is a start location of the turn segment and the second swath arrival location is a finish location of the turn segment.

5. The method of claim 3, wherein each of the agricultural vehicle position, the first swath departure location and the second swath arrival location include associated vectors indicative of respective position and orientation; and comparing the agricultural vehicle position with the first swath departure location or the second swath arrival location to determine arrival includes comparing the associated vectors.

6. The method of claim 1, wherein automatically toggling the swath guidance system and the turn guidance system proximate the transverse second zone swath includes:

sensing the transverse second zone swath;
comparing an agricultural vehicle position relative to the sensed transverse second zone swath; and
initiating automatic toggling based on an arrival of the agricultural vehicle at a first swath departure location associated with the sensed transverse second zone swath.

7. The method of claim 6, wherein sensing the transverse second zone swath includes one or more of detecting a swath edge, one or more crop rows, a second guidance line or an obstacle respectively associated with the transverse second zone swath.

8. The method of claim 1, wherein automatically toggling the swath guidance system and the turn guidance system proximate the transverse second zone swath includes:

sensing an end of the first zone swath;
comparing an agricultural vehicle position relative to the end of the first zone swath; and initiating automatic toggling based on an arrival of the agricultural vehicle at a first swath departure location associated with the sensed end of the first zone swath.

9. The method of claim 1, wherein automatically toggling includes one or more of:

prioritizing the swath guidance system over the turn guidance system; or
prioritizing the turn guidance system over the swath guidance system.

10. The method of claim 1, wherein guiding the agricultural vehicle along the first zone swath with the swath guidance system includes guiding the agricultural vehicle with a row guidance system configured to guide the agricultural vehicle between crop rows.

11. The method of claim 1, wherein guiding the agricultural vehicle along the turn segment with the turn guidance system includes guiding the agricultural vehicle with one or more of a global positioning system (GPS) guidance system or real time kinematic (RTK) guidance system.

12. The method of claim 1 comprising guiding the agricultural vehicle from the first zone swath to a proximate first zone swath with a composite turn through the transverse second zone swath, guiding through the composite turn including guiding with the turn guidance system and the swath guidance system.

13. The method of claim 12, wherein the composite turn includes first and second turn segments and an intervening swath segment, and the turn segment includes the first turn segment; and guiding the agricultural vehicle with the composite turn includes:

guiding the agricultural vehicle along the first turn segment from the first zone swath to the transverse second zone swath with the turn guidance system;
guiding the agricultural vehicle along the intervening swath segment of the transverse second zone swath with the swath guidance system;
automatically toggling the swath guidance system and the independent turn guidance system proximate the proximate first zone swath;
guiding the agricultural vehicle along the second turn segment from the transverse second zone swath to the proximate first zone swath with the turn guidance system;
automatically toggling the independent turn guidance system and the swath guidance system proximate to the proximate first zone swath; and
guiding the agricultural vehicle along the proximate first zone swath with the swath guidance system.

14. The method of claim 1 comprising generating the turn segment including:

plotting the turn segment based on a turn profile and a first swath departure location and a second swath arrival location.

15. The method of claim 14, wherein generating the turn segment includes at least one of:

generating the turn segment according to first and second guidance lines associated with the first and transverse second zone swaths; or
generating the turn segment according to sensing of one or more of the first or transverse second zone swaths including guidance lines, swath edges, obstacles, obstacle perimeters, headlands, crop rows or crop edges associated with the first or transverse second zone swaths in an ongoing manner from the agricultural vehicle approaching the transverse second zone swath.

16. The method of claim 14, wherein generating the turn segment includes determining the first swath departure location and the second swath arrival location including:
- moving a virtual turn profile corresponding to the turn profile toward an intersection of the first and transverse second zone swaths;
- indexing a first intersection of the virtual turn profile with the first zone swath as the first swath departure location; and
- indexing a second intersection of the turn profile with the transverse second zone swath as the second swath arrival location;
  - wherein the turn segment includes a portion of the virtual turn profile extending between the first swath departure location and the second swath arrival location.

17. The method of claim 16, wherein the turn profile includes a modulated turn profile based on an initial turn profile, and generating the turn segment includes:
- determining a virtual turning radius for the agricultural vehicle according to one or more vehicle characteristics associated with the agricultural vehicle or one or more field characteristics associated with an agricultural field including the first and transverse second zone swaths; and
- modulating the initial turn profile based on the virtual turning radius to determine the modulated turn profile.

18. The method of claim 16, wherein moving the virtual turn profile includes moving the virtual turn profile along a first guidance line of the first zone swath toward a second guidance line of the transverse second zone swath.

19. The method of claim 16, wherein moving the virtual turn profile includes moving the virtual turn profile toward an intersection of a first guidance line of the first zone swath and a second guidance line of the transverse second zone swath.

20. The method of claim 16, wherein indexing the first and second intersections includes indexing tangent intersections between the virtual turn profile and the first and transverse second zone swaths, respectively.

21. The method of claim 16, wherein indexing the first and second intersections includes indexing crossing intersections between the virtual turn profile and the first and transverse second zone swaths, respectively.

22. The method of claim 1, wherein guiding the agricultural vehicle along the first zone swath and the transverse second zone swath includes maintaining ground engaging elements of the agricultural vehicle between crop rows of the respective first and transverse second zone swaths.

23. A guidance assembly for autonomously driving an agricultural vehicle comprising:
- an automated driving interface configured to control one or more driving functions of the agricultural vehicle;
- a pathing system configured to provide an array of swaths indexed to a field;
  - wherein the array of swaths includes:
    - at least a first zone swath within a first field zone; and
    - a transverse second zone swath within a second field zone; and
- a composite guidance system in communication with the automated driving interface and the pathing system, the composite guidance system includes:
  - a turn guidance system configured to guide the agricultural vehicle along at least one turn segment extending between the first zone swath and the transverse second zone swath;
    - wherein the turn guidance system is configured to:
      - move a turn profile along one of the first zone swath or the transverse second zone swath toward an intersection of the first zone swath and the transverse second zone swath; and
      - detect an intersection of the first zone swath with the second zone swath and the turn profile;
    - wherein the turn profile includes a curved contour and the turn profile is based on characteristics of the agricultural vehicle, and the turn segment includes at least a portion of the curved contour of the turn profile;
  - a swath guidance system configured to guide the agricultural vehicle along the first zone swath and the transverse second zone swath, independent of the turn guidance system, to follow each of the first zone swath and transverse second zone swath, respectively;
  - a comparator configured to compare an agricultural vehicle position of the agricultural vehicle with swath departure and arrival locations; and
  - an interswath turning element configured to automatically toggle between the turn guidance system and the swath guidance system from an activated configuration to a paused configuration according to the compared agricultural vehicle position and the swath departure and arrival locations.

24. The guidance assembly of claim 23, wherein the automated driving interface is configured to control driving functions including each of steering, acceleration, and braking.

25. The guidance assembly of claim 23, wherein the array of swaths include one or more of guidance lines, virtual swath lines, A-B lines, planned paths for the agricultural vehicle, actual swath lines, swath edges, crop rows, crop edges, ridges or mounds for crop planting, tram lines, previous vehicle passage swath lines, obstacle perimeters, boundaries, fence lines, old fence lines, water ways, river and creek beds, actual or virtual coverage of an agricultural implement of the agricultural vehicle.

26. The guidance assembly of claim 23, wherein one or more of the pathing system or the composite guidance system is an element of a field computer.

27. The guidance assembly of claim 23, wherein the swath guidance system includes a row guidance system configured to maintain ground engaging elements of the agricultural vehicle between crop rows associated with one or more of the first zone swath or transverse second zone swath.

28. The guidance assembly of claim 23, wherein the turn guidance system includes one or more of a GPS guidance system or a real time kinematics (RTK) guidance system.

29. The guidance assembly of claim 23 comprising one or more swath sensors configured for coupling with the agricultural vehicle, and the one or more swath sensors are in communication with the swath guidance system; and
- the one or more swath sensors are configured to detect one or more of crop rows, crop row edges, swath edges, unharvested crop edges, or obstacles.

30. The guidance assembly of claim 23, wherein the array of swaths include:
- a plurality of first zone swaths, including the first zone swath, indexed to an interior portion of the field as the first field zone; and
- at least one second zone swath, including the transverse second zone swath, indexed to a perimeter portion of the field as the second field zone.

31. The guidance assembly of claim 23, wherein the array of swaths include:

a plurality of first zone swaths, including the first zone swath, indexed to a first portion of the field as the first field zone; and a plurality of second zone swaths, including the transverse second zone swath, indexed to one or more obstacle perimeters of the field as the second field zone.

32. The guidance assembly of claim 23, wherein the array of swaths include:
a plurality of first zone swaths, including the first zone swath, indexed to a first portion of the field as the first field zone; and
a plurality of second zone swaths, including the transverse second zone swath, indexed to a second portion of the field as the second field zone.

33. The guidance assembly of claim 23, wherein the turn guidance system includes a turn profile element having one or more turn profiles.

34. The guidance assembly of claim 23, wherein the swath departure location and swath arrival location include at least a first swath departure location and a second swath arrival location, respectively, the turn guidance system includes:
a turn plotting element configured to plot the turn segment based on the turn profile and the first or second swath departure location and the first or second swath arrival location.

35. The guidance assembly of claim 34, wherein the turn plotting element includes:
a turn profile direction element configured to virtually move the turn profile toward an intersection of the first zone swath and the second zone swath;
an intersection element configured to index a first intersection of a first portion of the curved contour of the turn profile with the first zone swath as the first swath departure location, and index a second intersection of a second portion of the curved contour of the turn profile with the transverse second zone swath as the second swath arrival location; and
wherein the turn segment includes a portion of the curved contour of the turn profile extending between the first swath departure location and the second swath arrival location.

36. The guidance assembly of claim 34, wherein the turn profile includes a modulated turn profile based on an initial turn profile, and the turn plotting element includes:
a virtual turning radius element configured to determine a virtual turning radius for the agricultural vehicle according to the one more agricultural vehicle characteristics associated with the agricultural vehicle or one or more field characteristics associated with the field; and
a turn modification element configured to modify the initial turn profile based on the virtual turning radius to determine the modulated turn profile.

37. The guidance assembly of claim 23, wherein the turn guidance system includes a database of one or more turn profiles including:
a circular profile;
an almost square profile;
a square profile;
an elliptical profile;
a Dubins path;
a clothoid spline profile;
a composite turn profile including one or more turn profiles; and
radius, dimensions, shape and sectioned variations of the one or more turn profiles.

38. The guidance assembly of claim 23, wherein the turn guidance system is configured to guide the agricultural vehicle along the at least one turn segment extending from the first swath departure location associated with the first swath to the second swath arrival location associated with the transverse second swath.

39. The guidance assembly of claim 23, wherein the first and second zone swaths include one or more of guidance lines, crop rows, space between crop rows, contours of the array of swaths, or swath edges associated with the respective first zone swath and transverse second zone swath.

40. The guidance assembly of claim 23, wherein the swath guidance system configured to guide the agricultural vehicle to follow the first zone swath and second zone swath includes aligning the agricultural vehicle with the first zone swath and the second zone swath.

41. The guidance assembly of claim 23, wherein the swath guidance system configured to guide the agricultural vehicle to follow the first zone swath and the second zone swath includes orienting the agricultural vehicle to correspond with the first zone swath and the second zone swath.

42. The guidance assembly of claim 23 comprising a processor including one or more of the pathing system or the composite guidance system.

43. The guidance assembly of claim 23 further including:
a composite turn including at least a first turn segment, an intervening swath segment and a second turn segment.

44. The guidance assembly of claim 23, wherein the turn profile includes an enclosed shape.

45. The guidance assembly of claim 44, wherein the enclosed shape includes an ellipse.

46. The guidance assembly of claim 23, wherein the turn profile includes a common shape having the curved contour.

47. The guidance assembly of claim 23, wherein the turn guidance system is configured to modify the turn profile according to changes in one or more of a field characteristic or the characteristics of the agricultural vehicle.

* * * * *